US012756905B2

(12) United States Patent
Liu et al.

(10) Patent No.: US 12,756,905 B2
(45) Date of Patent: Oct. 6, 2026

(54) INFORMATION PROCESSING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Silin Liu, Shenzhen (CN); Qingqing Ren, Shenzhen (CN); Zirui Cheng, Shenzhen (CN); Yanhua Zhao, Shenzhen (CN); Guiyi Yang, Shenzhen (CN); Shuyuan Li, Shenzhen (CN); Chuanyu Zhang, Shenzhen (CN); Junchao Yin, Shenzhen (CN); Teng Teng, Shenzhen (CN); Shaoxia Li, Shenzhen (CN); Hui Yang, Shenzhen (CN); Yunming Huang, Shenzhen (CN); Jun Deng, Shenzhen (CN); Xinming Luo, Shenzhen (CN); Yizong Wang, Shenzhen (CN); Chuanming Zhu, Shenzhen (CN); Bingyi Wu, Shenzhen (CN); Jinchao Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 44 days.

(21) Appl. No.: 18/917,523

(22) Filed: Oct. 16, 2024

(65) Prior Publication Data

US 2025/0039517 A1 Jan. 30, 2025

Related U.S. Application Data

(63) Continuation of application No. PCT/CN2023/124148, filed on Oct. 12, 2023.

(30) Foreign Application Priority Data

Dec. 19, 2022 (CN) ......................... 202211632410.9

(51) Int. Cl.

| | |
|---|---|
| *H04N 21/81* | (2011.01) |
| *H04N 21/431* | (2011.01) |
| *H04N 21/44* | (2011.01) |

(52) U.S. Cl.

CPC ....... *H04N 21/812* (2013.01); *H04N 21/4318* (2013.01); *H04N 21/44008* (2013.01); *H04N 21/44016* (2013.01)

(58) Field of Classification Search

CPC ............. H04N 21/812; H04N 21/4318; H04N 21/44008; H04N 21/44016; H04N 21/4316; H04N 21/4668

(Continued)

(56) References Cited

U.S. PATENT DOCUMENTS

| | | | | |
|---|---|---|---|---|
| 11,212,449 B1 * | 12/2021 | Manzari | ................. | H04N 23/62 |
| 2009/0222510 A1 * | 9/2009 | van Riel | ............ | G06Q 30/0277 709/203 |

(Continued)

FOREIGN PATENT DOCUMENTS

| | | | | |
|---|---|---|---|---|
| CN | 109272565 A * | 1/2019 | ........... | H04L 65/764 |
| CN | 110111125 A | 8/2019 | | |

(Continued)

OTHER PUBLICATIONS

International Search Report and Written Opinion with English translations, Nov. 25, 2023, pp. 1-11, issued in PCT/CN2023/124148, China National Intellectual Progertx Administration, Beijing, China.

*Primary Examiner* — Cynthia M Fogg

(74) *Attorney, Agent, or Firm* — Crowell & Moring LLP

(57) ABSTRACT

This application provides an information processing method and apparatus, an electronic device, a computer program (Continued)

product, and a non-transitory computer-readable storage medium. The method includes: obtaining an information stream and a promotion video in response to a user trigger operation, the information stream including at least one piece of media information and the promotion video including at least one material to be recommended; and displaying, at a first area of an information stream interface, a first part of the promotion video in a presentation mode and displaying, at a second area of the information stream interface, a second part of the promotion video in a transparent mode, so as to enable the information stream interface to be revealed through the second area, the first area and the second area being dynamically changing areas.

20 Claims, 14 Drawing Sheets

(58) Field of Classification Search
USPC ............................................................ 725/42
See application file for complete search history.

(56) References Cited

U.S. PATENT DOCUMENTS

| | | | | |
|---|---|---|---|---|
| 2010/0057779 | A1 | 3/2010 | Pan | |
| 2011/0075992 | A1 * | 3/2011 | Mei ...................... | G11B 27/034 705/14.42 |
| 2014/0317655 | A1 * | 10/2014 | Lin ...................... | H04N 21/812 725/34 |
| 2015/0025948 | A1 * | 1/2015 | Sankaran ........... | G06Q 30/0242 705/14.4 |
| 2015/0160853 | A1 * | 6/2015 | Hwang ............... | G06F 3/04842 715/720 |

FOREIGN PATENT DOCUMENTS

| | | | | |
|---|---|---|---|---|
| CN | 110519645 | A | | 11/2019 |
| CN | 112799733 | A | | 5/2021 |
| CN | 113709554 | A | | 11/2021 |
| CN | 113727166 | A | | 11/2021 |
| CN | 113986003 | A | | 1/2022 |
| JP | 2019028797 | A | * | 2/2019 |

* cited by examiner

INFORMATION PROCESSING METHOD AND APPARATUS, ELECTRONIC DEVICE, COMPUTER-READABLE STORAGE MEDIUM, AND COMPUTER PROGRAM PRODUCT

RELATED APPLICATION

This application claims priority as a Continuation to PCT/CN2023/124148 filed on Oct. 12, 2023, which claims priority to Chinese Patent Application No. 202211632410.9, entitled "INFORMATION PROCESSING METHOD AND APPARATUS, ELECTRONIC DEVICE, COMPUTER-READABLE STORAGE MEDIUM, AND COMPUTER PROGRAM PRODUCT" and filed with the China National Intellectual Property Administration on Dec. 19, 2022, both of which are incorporated herein by reference.

FIELD OF THE TECHNOLOGY

This application relates to the field of computer technologies, and in particular, to an information processing method and apparatus, an electronic device, a computer-readable storage medium, and a computer program product.

BACKGROUND OF THE DISCLOSURE

In the related art, the screen-on recommend videos are configured to be loaded when the applications are started, and are automatically closed after the display is completed, to display the home pages of the applications. Information stream recommend videos are recommend videos in a stream of information media and audiovisual media content in an application. Video recommend modes such as screen-on recommend videos and information stream recommend videos are all configured to insert recommend videos during use of an application, to improve the recommend effect. However, the video display modes in the related art are undiversified and lacks interaction with users, and therefore the user experience is poor, which reduces the user's interest in the video recommend content and further affects the recommend efficiency.

In the related art, there are no better video recommend modes.

SUMMARY

Exemplary embodiments of this disclosure provide an information processing method, an information processing apparatus, an electronic device, a computer-readable storage medium, and a computer program product, which can play a video in a transparent mode in an information stream, so as to improve the video recommend efficiency.

Technical solutions in the exemplary embodiments of this disclosure are implemented as follows:

An exemplary embodiment of this disclosure provides an information processing method, performed by an electronic device, the method including:

- obtaining an information stream and a promotion video in response to a user trigger operation, the information stream including at least one piece of media information and the promotion video including at least one material to be recommended; and
- displaying, at a first area of an information stream interface, a first part of the promotion video in a presentation mode and displaying, at a second area of the information stream interface, a second part of the promotion video in a transparent mode, so as to enable the information stream interface to be revealed through the second area, the first area and the second area being dynamically changing areas.

An exemplary embodiment of this disclosure further provides an information processing apparatus, including:

- an obtaining module, configured to obtain an information stream and a promotion video in response to a user trigger operation, the information stream including at least one piece of media information and the promotion video including at least one material to be recommended; and
- a display module, configured to display, at a first area of an information stream interface, a first part of the promotion video in a presentation mode and display, at a second area of the information stream interface, a second part of the promotion video in a transparent mode, so as to enable the information stream interface to be revealed through the second area, the first area and the second area being dynamically changing areas.

An exemplary embodiment of this disclosure provides an electronic device, the electronic device including:

- a memory, configured to store a computer-executable instruction; and
- a processor, configured to implement an information processing method according to the exemplary embodiments of this disclosure by executing the computer-executable instruction stored in the memory.

An exemplary embodiment of this disclosure further provides a computer-readable storage medium, having a computer-executable instruction stored therein, and implementing, when executed by a processor, the information processing method according to the exemplary embodiments of this disclosure.

An exemplary embodiment of this disclosure provides a computer program product, including a computer program or a computer-executable instruction, and the computer program or the computer-executable instruction, when executed by a processor, implementing the information processing method according to the exemplary embodiments of this disclosure.

The exemplary embodiments of this disclosure have the following beneficial effects:

- the first part of the promotion video is displayed in the information stream interface in the presentation mode, so that the content of the promotion video can be presented to the users, and the second part of the promotion video is displayed in the transparent mode, so that the information stream interface can be displayed through the second area, so as to reduce the degree of blocking of the promotion video in the information stream interface and reduce the impact on the experience of watching the information stream. The first area and the second area are dynamically changing areas, and a lower-layer information stream interface can be displayed when dynamic content of the promotion video is displayed, so that the visual effect and attractiveness of the video material is improved, the experience of the users when watching the promotion video is improved, and the effect of performing video recommend processing can be improved. The first part and the second part of the promotion video are displayed in different modes. Compared with the solution in which the two parts are displayed in a presentation mode in the related technologies, the computing resources required by a video player in an operation process of an application can be saved, the internal memory usage can be reduced, and a sticking phenomenon of the application during playing of the promotion video can be avoided.

DESCRIPTION OF EMBODIMENTS

Figure 1:
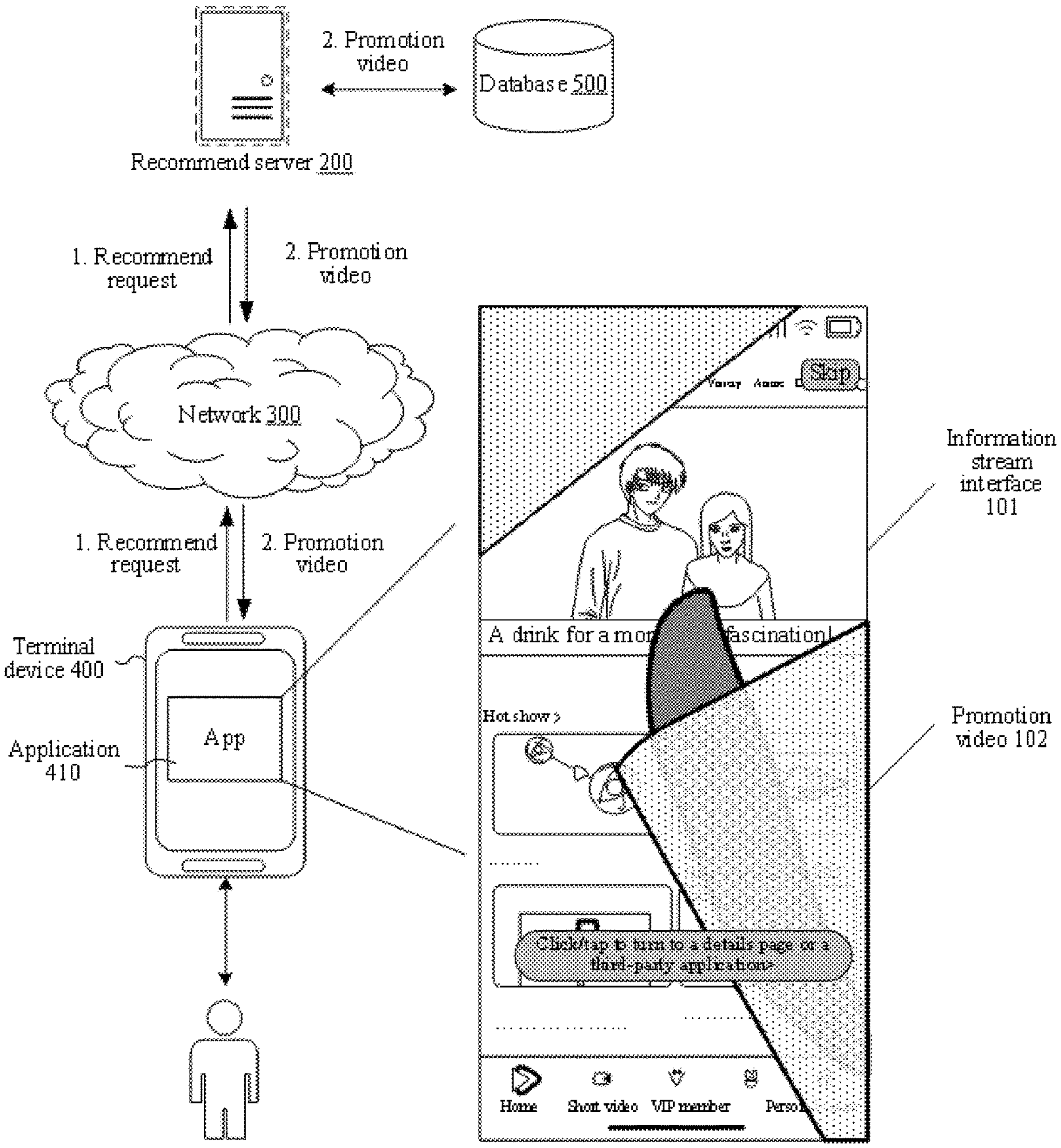
FIG. 1 is a schematic diagram of an application mode of an information processing method according to an exemplary embodiment of this disclosure.

To make the objectives, technical solutions, and advantages of this disclosure clearer, the following describes this disclosure in further detail with reference to the accompanying drawings. The described exemplary embodiments are not to be considered as a limitation to this disclosure. All other embodiments obtained by a person of ordinary skill in the art without creative efforts shall fall within the protection scope of this disclosure.

In the following description, the term "some exemplary embodiments" describes subsets of all possible exemplary embodiments, but "some exemplary embodiments" may be the same subset or different subsets of all the possible exemplary embodiments, and can be combined with each other without conflict.

In the following descriptions, the terms "first/second/third" involved are merely intended to distinguish between similar objects rather than describe specific orders. The terms "first/second/third" termed in such a way is interchangeable in proper circumstances, so that the exemplary embodiments of this disclosure described herein can be implemented in order other than those illustrated or described herein.

In the exemplary embodiments of this disclosure, relevant data related to user information and user feedback data is involved. When the exemplary embodiments of this disclosure are applied to specific products or technologies, user permission or consent is required, and the collection, use, and processing of relevant data need to comply with relevant laws, regulations, and standards of relevant countries and regions.

Unless otherwise defined, meanings of all technical and scientific terms used in this specification are the same as those usually understood by a person skilled in the art to which this disclosure belongs. The terms used in the specification are merely intended to describe objectives of the exemplary embodiments of this disclosure, but are not intended to limit this disclosure.

Before the exemplary embodiments of this disclosure are further described in detail, a description is made on nouns and terms in the exemplary embodiments of this disclosure, and the nouns and terms in the exemplary embodiments of this disclosure are applicable to the following explanations.

1) Color (Red Green Blue, RGB) channel: RGB represent colors of three channels, red, green, and blue channels. Various colors are obtained by changing the channels of the three colors, namely, red (R), green (G), and blue (B), and mutually superimposing them.

2) Transparency: A nature or condition that light transmits through a substance. Transparency in the graphics refers to a degree of transparency of an image. The degree of transparency is expressed in percentage. Pictures and colorless and transparent stages can be divided into 100. When the degree of transparency is 100, the image presents a colorless and transparent state. The degree of transparency of an image affects the effect at which it coincides another image (or background). For example, if the degree of transparency of an image A is 100%, an image B superimposed under the image A can be fully displayed; and if the degree of transparency of an image A is 50%, by superimposing the image A on an image B, an effect of overlapping content in the two images can be presented.

3) Transparent mode: It refers to a mode in which an image or video is displayed with a degree of transparency (the degree of transparency is greater than 0%, or less than or equal to 100).

4) Transparent channel: It is also known as an a channel (a transparent channel or Alpha channel). In the graphics, a transparent channel is configured to characterize the transparency and translucency of an image. For example, in a bitmap stored with 16 bits per pixel, for each pixel in the graph, 5 bits represent red, 5 bits represent green, 5 bits represent blue, and the last bit represents a value (alpha value) corresponding to an alpha channel. A value range of the alpha value is between 0 and 1. The alpha value represents a degree of opacity. When the alpha value of a pixel is equal to 1, the pixel is completely opaque.

5) Transparent video: A transparent video is a video presented in the following modes: At least a partial area of the video picture is played in a transparent mode, and an image at a lower layer of the video can be observed through the partial area. For example, a screen-on advertisement video blocks an interface of an application that displays an information stream, an area corresponding to a foreground video frame of the screen-on advertisement video is in an opaque state, an area corresponding to a background video frame is in a transparent state, and the area corresponding to the background video frame displays an information stream of the application blocked by the advertisement video.

6) Splash screen advertisement: It is also known as a screen-on advertisement, and is an advertisement form in which the advertisement is loaded during start of an application and is automatically closed after displaying is completed, to enter a home page of the application.

7) Information stream advertisement: It is an advertisement located in a friend dynamic, or information media and audiovisual media content stream of an application.

8) Surface View component: A Surface View component is embedded with a surface component for drawing. The Surface View component controls a format and size of a surface view and a drawing position, and provides two threads: a user interface (UI) thread and a rendering thread. By using the two threads, efficient interface real-time update is achieved through a "double buffer" mechanism.

Exemplary embodiments of this disclosure provide an information processing method, an information processing apparatus, an electronic device, a computer-readable storage medium, and a computer program product, which can play a video in a transparent mode in an information stream.

The following is an exemplary application of the electronic device provided in the exemplary embodiments of this disclosure. The electronic device provided in the exemplary embodiments of this disclosure may be implemented as a user terminal in any type, such as a laptop, a tablet, a desktop computer, a set-top box, a mobile device (for example, a mobile phone, a portable music player, a personal digital assistant, a dedicated messaging device, and a portable game device), an in-vehicle terminal, a virtual reality (VR) device, or an augmented reality (AR) device. An exemplary application in which a device is implemented as a terminal device is described below.

FIG. 1 is a schematic diagram of an application mode of an information processing method according to an exemplary embodiment of this disclosure. For example, FIG. 1 relates to a recommend server 200, a network 300, a terminal device 400, and a database 500. The terminal device 400 is connected to the recommend server 200 through the network 300. The network 300 may be a wide area network or a local area network, or a combination thereof.

In some exemplary embodiments, the recommend server 200 may be a server corresponding to an application. For example, if the application is social software, the recommend server 200 is a server of a social platform, and is configured to obtain an information stream corresponding to the social platform and a related advertisement video. A video displayed on an upper layer of an information stream interface corresponding to the application may be an advertisement video. An application 410 is video software installed in the terminal device 400.

In some exemplary embodiments, the information processing method in this exemplary embodiment of this disclosure may be applied to the following application scenarios: 1. In a process of starting an application, an information stream and a screen-on video are obtained, and a screen-on video including a transparent area is displayed on an upper layer of an information stream interface corresponding to the application. 2. During use of an application, in response to a refresh operation on an information stream (for example, dragging the information stream downward), an advertisement video including a transparent area is displayed on an upper layer of an information stream interface corresponding to the application.

In some exemplary embodiments, when the application 410 is started in the terminal device 400, the recommend server 200 obtains a promotion video and an information stream corresponding to the terminal device 400 from the database 500, and transmits the promotion video and the information stream to the terminal device 400. An information stream interface 101 is displayed on a screen of the terminal device 400, and a promotion video 102 including a transparent area is displayed on the information stream interface 101 through a video playing interface. The terminal device 400 plays a second area other than the first area in a picture of the video in a transparent mode, so that the information stream interface is revealed through the second area.

The exemplary embodiments of this disclosure may be implemented by the blockchain technology. A video displayed in the exemplary embodiments of this disclosure may be uploaded to blockchain for storage, and the reliability of the video is guaranteed by a consensus algorithm. The blockchain is a new application mode of computer technology such as distributed data storage, peer-to-peer transmission, a consensus mechanism, an encryption algorithm, or the like. The blockchain is essentially a decentralized database and is a string of data blocks that are associated using cryptographic methods. Each data block includes information about a batch of network transactions, configured for verifying the validity of information (anti-counterfeiting) thereof and generating a next block. The blockchain may include a blockchain bottom platform, a platform product service layer, and an application service layer.

The exemplary embodiments of this disclosure may be implemented by the database technology. A database, in short, may be regarded as a place of an electronic file cabinet for storing electronic files, and a user may add, query, update, delete, or perform other operations on data in a file. The so-called "database" is a collection of data that is stored together in a particular way, can be shared with a plurality of users, has as little redundancy as possible, and is independent of applications.

A database management system (DBMS) is a computer software system designed to manage databases, and generally has basic functions such as storage, interception, security, and backup. The database management system may be classified according to a database model supported thereby, for example, relational, or an extensible markup language (XML); classified according to a type of computer supported thereby, for example, a server cluster or a mobile phone; classified according to a query language used, for example, a structured query language (SQL) or XQuery; classified according to a performance impulse focus, for example, a maximum scale or a maximum running speed; or classified according to other classification methods. Regardless of the types of classification methods used, some DBMSs are capable of crossing categories, for example, supporting a plurality of query languages simultaneously.

The exemplary embodiments of this disclosure may alternatively be implemented by the cloud technology. The cloud technology is a generic term for a network technology, an information technology, an integration technology, a management platform technology, an application technology, and the like applied based on a cloud computing commercial mode, and can form a resource pool, which is used on demand and is flexible and convenient. The cloud computing technology is to become an important support. Backend services of a technology network system require a huge amount of computing and storage resources, such as video websites, image websites, and more portal websites. Accompanied with the high-level development and application of the Internet industry, as well as the promotion of the needs of search services, social networks, mobile commerce, and open collaboration, every item may have its own hash code identification mark in the future, which needs to be transmitted to a backend system for logic processing. Data at different levels may be processed separately, and various types of industry data require strong system back support, which can only be implemented through cloud computing.

In some exemplary embodiments, the recommend server 200 may be an independent physical server, or a server cluster or distributed system composed of a plurality of physical servers, or may be a cloud server for providing basic cloud computing services, such as a cloud service, a cloud database, cloud computing, a cloud function, cloud storage, a network service, cloud communication, a middleware service, a domain name service, a security service, a CDN, big data, and an artificial intelligence platform. The electronic device may be a smartphone, a tablet, a laptop, a desktop computer, a smart speaker, a smartwatch, or the like, but is not limited thereto. The terminal device and the server may be directly or indirectly connected in wired or wireless communication mode, which is not limited in the exemplary embodiments of this disclosure.

In some exemplary embodiments, the terminal device 400 may implement the information processing method provided in the exemplary embodiments of this disclosure by running a computer program. For example, the computer program may be a native program or software module in an operating system; may be a native application (APP), that is, a program that can run after being installed in the operating system, for example, a social APP, or a video APP; or may be an applet, that is, an application that can run only after being downloaded to a browser environment; or may be an applet that can be embedded into any APP. To sum up, the computer program may be any form of application, module, or plug-in.

Figure 2:
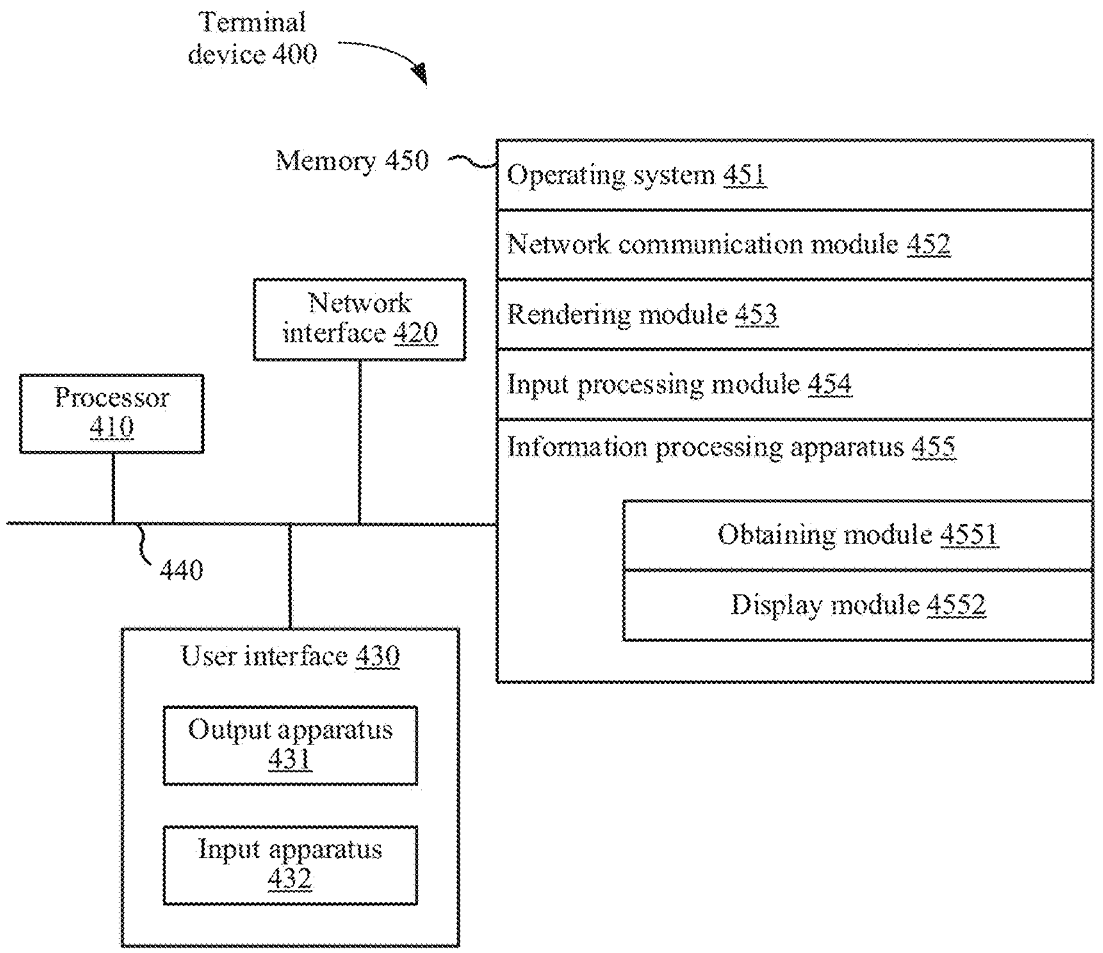
FIG. 2 is a schematic structural diagram of a terminal device according to an exemplary embodiment of this disclosure.

FIG. 2 is a schematic structural diagram of an electronic device according to an exemplary embodiment of this disclosure. The electronic device is a terminal device. As shown in FIG. 2, a terminal device 400 includes: at least one processor 410, a memory 450, at least one network interface 420, and a user interface 430. Components in the terminal 400 are coupled by using a bus system 440. The bus system 440 is configured to implement connection and communication between the components. In addition to a data bus, the bus system 440 further includes a power supply bus, a control bus, and a state signal bus. However, for ease of clear description, all types of buses in FIG. 2 are marked as the bus system 440.

The processor 410 may be an integrated circuit chip with signal processing capabilities, such as a general-purpose processor, a digital signal processor (DSP), or other programmable logic devices, discrete gate or transistor logic devices, or discrete hardware components, wherein a general-purpose processor may be a microprocessor or any conventional processor.

The user interface 430 includes one or more output apparatuses 431 that enable media content to be presented, including one or more speakers and/or one or more visual displays. The user interface 430 also includes one or more input apparatuses 432, including a user interface component that facilitates user input, such as a keyboard, a mouse, a microphone, a touchscreen display, a camera, or other input buttons and controls.

The memory 450 may be removable, non-removable, or a combination thereof. Exemplary hardware devices include a solid state memory, a hard disk drive, an optical disc drive, and the like. In an exemplary embodiment, the memory 450 includes one or more storage devices located physically away from the processor 410.

The memory 450 includes a transitory memory or a non-transitory memory, or may include both a transitory memory and a non-transitory memory. The non-transitory memory may be a read-only memory (ROM) and the non-transitory memory may be random access memory (RAM). The memory 450 described in this exemplary embodiment of this disclosure is intended to include any suitable type of memories.

In some exemplary embodiments, the first memory 450 can store data to support various operations, examples of which include programs, modules, and data structures, or subsets or supersets thereof, as illustrated below.

An operating system 451 includes system programs for processing various basic system services and performing hardware-related tasks, such as a framework layer, a core library layer, or a driver layer, for implementing various basic services and processing hardware-based tasks.

A network communication module 452 is configured to reach another electronic device via one or more (wired or wireless) network interfaces 420. For example, the network interface 420 includes: Bluetooth, wireless fidelity (WiFi), and universal serial bus (USB), or the like.

A presentation module 453 is configured to present information through one or more output apparatuses 431 (for example, a display screen or a speaker) associated with a user interface 430 (for example, a user interface for operating a peripheral device and displaying content and information).

An input processing module 454 is configured to detect one or more user inputs or interactions from one or more input apparatuses 432, and translate the detected input or interaction.

In some exemplary embodiments, the apparatus according to this exemplary embodiment of this disclosure may be implemented in a software mode. FIG. 2 illustrates an information processing apparatus 455 stored in the memory 450, which may be software in the form of a program, a plug-in, or the like, including the following software modules: an obtaining module 4551 and a display module 4552; these modules are logical and therefore can be combined or further split in different modes according to the functions to be implemented. The functions of the modules are to be explained below.

The information processing method provided in the exemplary embodiments of this disclosure is described in combination with the exemplary applications and implementations of the terminal provided in the exemplary embodiments of this disclosure.

The following describes the information processing method provided in the exemplary embodiments of this disclosure. As mentioned above, the electronic device for implementing the information processing method in the exemplary embodiments of this disclosure may be a terminal device. Therefore, the execution bodies of the operations are not repeated in the following text.

Figure 3A:
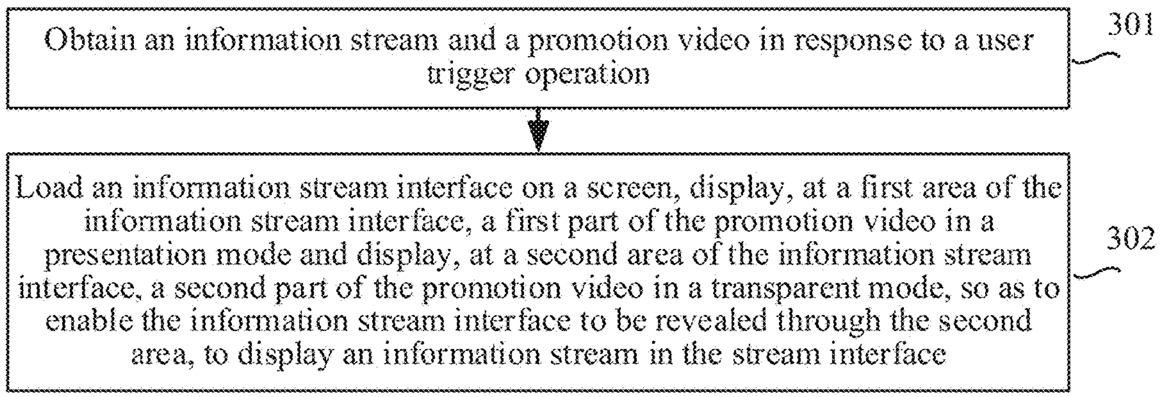
FIG. 3A is a schematic flowchart I of an information processing method according to an exemplary embodiment of this disclosure.

FIG. 3A is a schematic flowchart I of an information processing method according to an exemplary embodiment of this disclosure. A description is provided in combination with the operations shown in FIG. 3A.

Operation 301: Obtain an information stream and a promotion video in response to a user trigger operation.

For example, the information stream includes at least one piece of media information (for example, a text, an audio, or a video), and a picture of the promotion video includes at least one material to be recommended. The user trigger operation includes, but is not limited to, the following operations: a start operation by a user for an application in a terminal device or a refresh operation by a user for an application. The form of the trigger operation may be a click/tap operation, a press-and-hold operation, a drag operation, a shaking operation, human face recognition, and fingerprint recognition.

The information stream may be configured for being displayed in an application. For example, if the application is video software, cover pictures of a plurality of videos are displayed in an information stream interface of the video software. If the application is social software, information is blogs integrated with pictures and text, and titles of a plurality of blogs and thumbnails of the pictures in the blogs are displayed in an information stream interface of the social software.

The material to be recommended may be a virtual item (for example, a game prop or a service) or a real item (for example, food or clothes). The promotion video may be an advertisement video. For example, the item is a particular type of beverage, and the promotion video is an advertisement video for recommending the type of beverage.

Operation 302: Display, at a first area of an information stream interface, a first part of the promotion video in a presentation mode and display, at a second area of the information stream interface, a second part of the promotion video in a transparent mode, so as to enable the information stream interface to be revealed through the second area.

For example, displaying the first part of the promotion video in the presentation mode may be implemented through the following method: if transparent channel information corresponding to a pixel in a video frame is 1, rendering the pixel based on the transparent channel information, so that the pixel is displayed in an opaque state. An imaging effect of a pixel is affected by three channels of RGB and a transparent channel (alpha). The transparent channel information is an alpha value, a value range of the alpha value is [0, 1], the alpha value is configured for representing a degree of opacity of a pixel, and when the alpha value is 1, the pixel is completely opaque.

For example, the second part of the promotion video is displayed in a transparent mode, wherein the transparent mode refers to a mode in which an image or a video is displayed in a mode of transparency. The transparent channel information of the pixel may be 0, or another value less than 1, by rendering a pixel based on the transparent channel information, a pixel having a degree of transparency can be obtained, which is displayed in a transparent state, and therefore, the second part of the promotion video may be displayed in the transparent mode, so that at least part of the information stream interface is revealed through the second area.

For example, the first area and the second area are dynamically changing areas, and an area range of the dynamically changing areas changes along with time. If the first area includes at least one material, content of the second area may be blank, and positions of materials in each video frame in the promotion video are different, the first area and the second area are displayed as dynamically changing areas along with dynamical changes of the materials.

Figure 4:
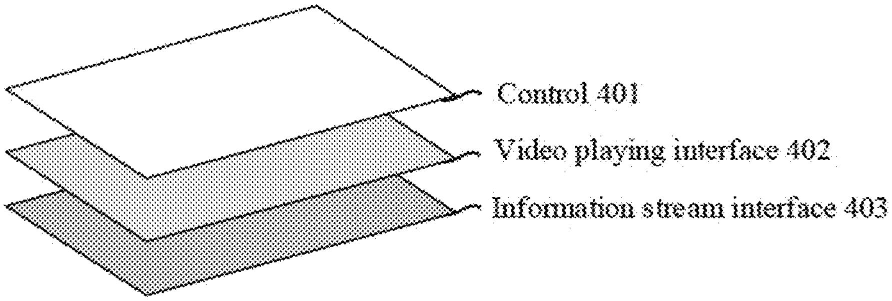
FIG. 4 is a schematic diagram of a hierarchical structure according to an exemplary embodiment of this disclosure.

The first area and the second area belong to the video playing interface, and the video playing interface is loaded on at least a part of the area (all or a partial area) of the information stream interface. For case of understanding, the following provides an explanation with reference to the accompanying drawings. FIG. 4 is a schematic diagram of a hierarchical structure according to an exemplary embodiment of this disclosure. A picture displayed on a screen of a terminal device is formed by superimposing images of a plurality of levels, and the levels are sequentially a control 401, a video playing interface 402, and an information stream interface 403 from top to bottom. The information stream interface 403 is an interface corresponding to an application. The video playing interface 402 is located above the information stream interface 403. If a partial area in the video playing interface is displayed in a transparent mode, a part of the information stream interface may be revealed through the video playing interface.

Figure 6A:
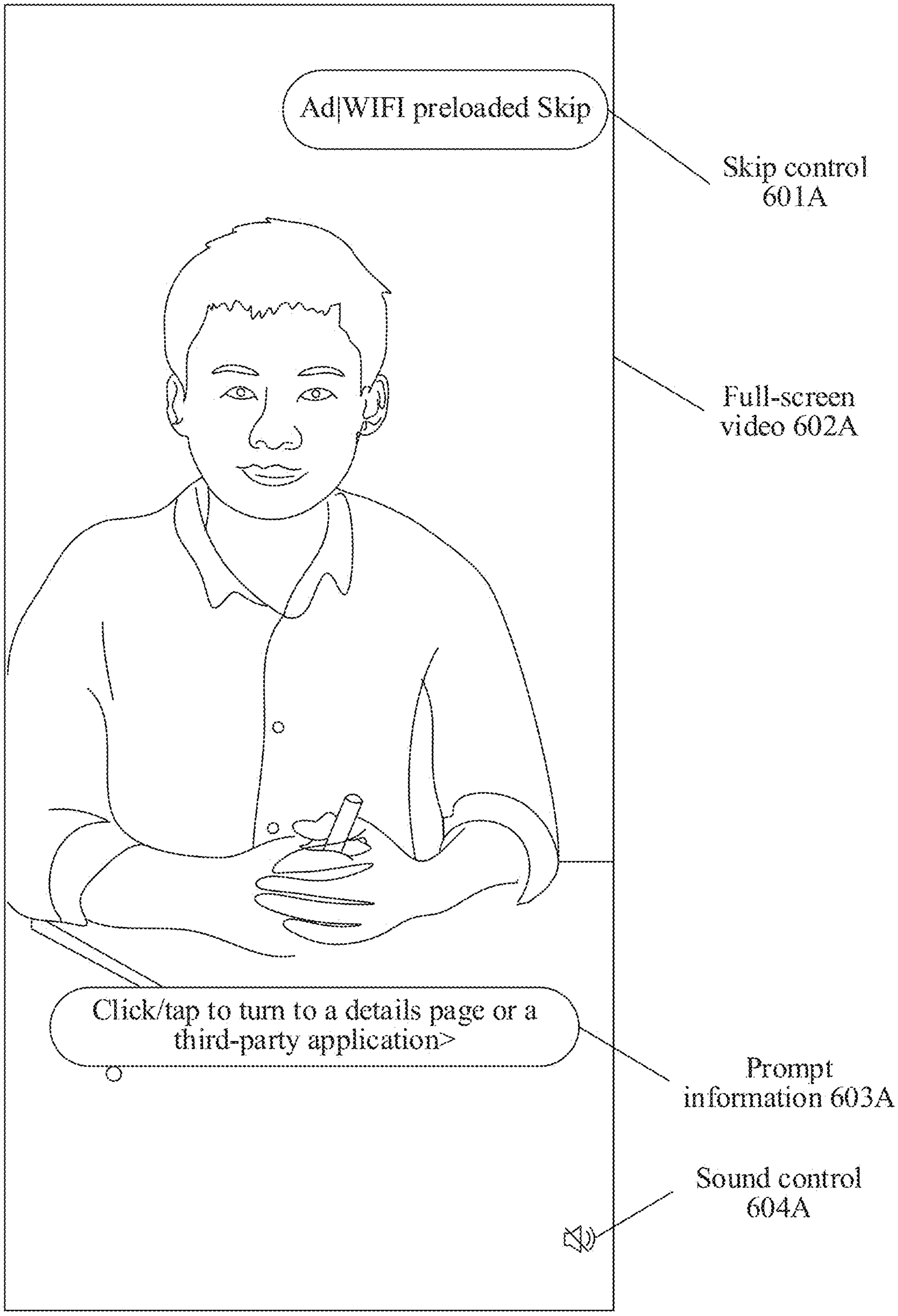
FIG. 6A is a schematic diagram I of an application interface according to an exemplary embodiment of this disclosure.
Figure 6B:
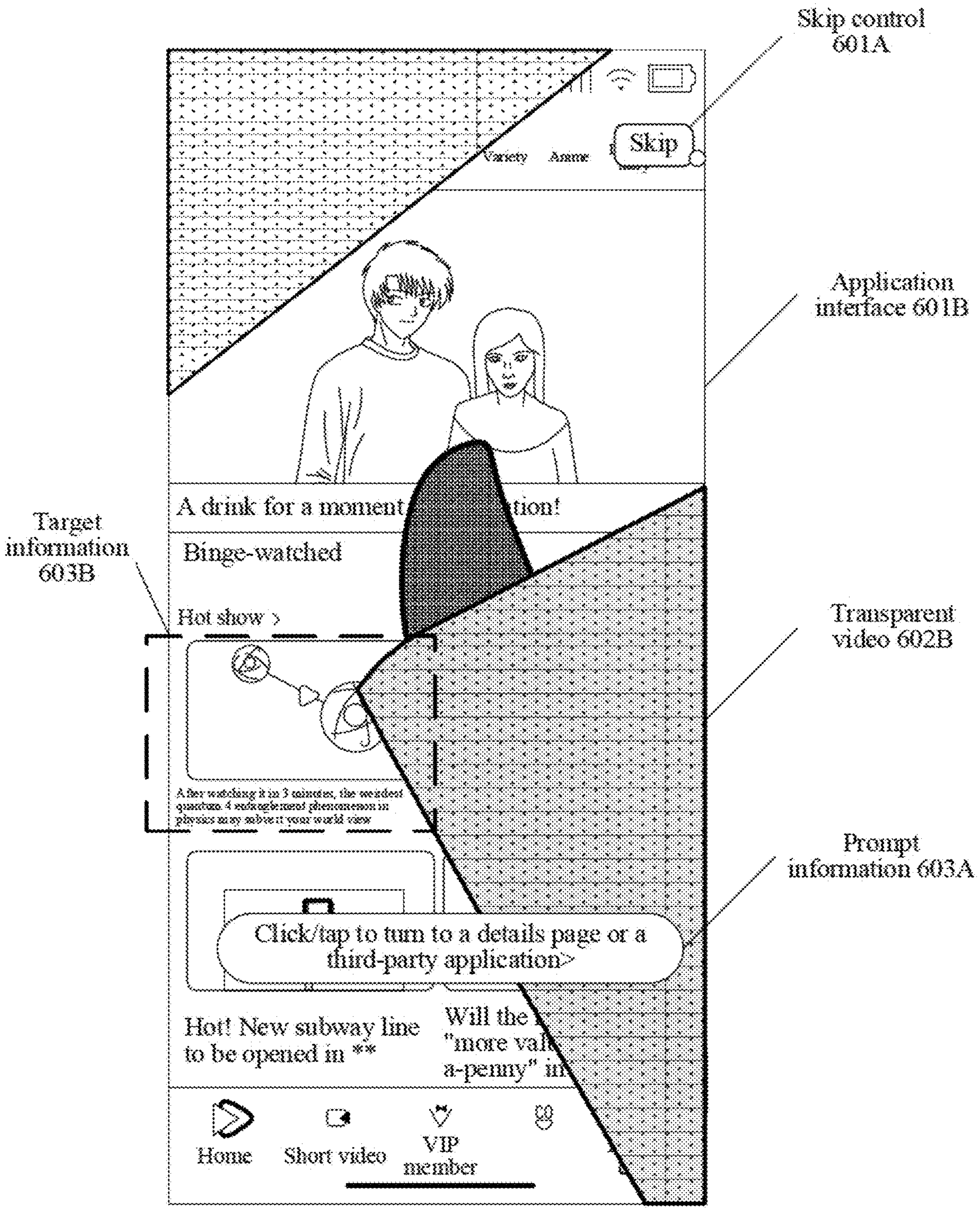
FIG. 6B is a schematic diagram II of an application interface according to an exemplary embodiment of this disclosure.
Figure 6C:
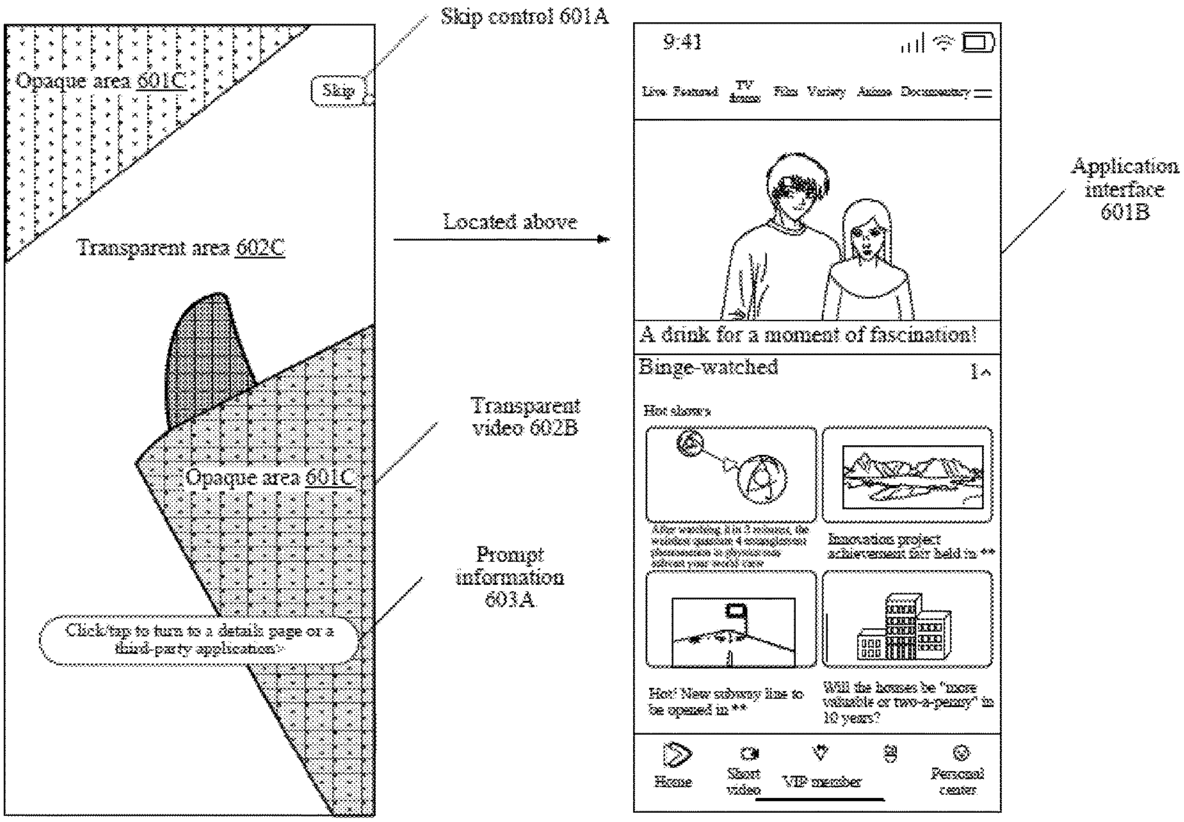
FIG. 6C is a schematic diagram III of an application interface according to an exemplary embodiment of this disclosure.

Based on the hierarchical structure of FIG. 4, a visual effect shown in FIG. 6B can be implemented in operation 302. FIG. 6B is a schematic diagram of an application interface according to an exemplary embodiment of this disclosure. A transparent video 602B (promotion video) is displayed above an application interface 601B. FIG. 6C is a schematic diagram of an application interface according to an exemplary embodiment of this disclosure. FIG. 6C is a parsing diagram of FIG. 6B. A size of the transparent video 602B is the same as a size of the application interface 601B (information stream interface) and is overlapped on the application interface 601B. A shaded area in the transparent video 602B is an opaque area 601C (first area), and a blank area is a transparent area 602C (second area).

In FIG. 6B, the video playing interface is displayed in full-screen, and a size thereof is the same as that of the information stream interface. In some exemplary embodiments, the video playing interface may be loaded only in a partial area of the information stream interface, and therefore the promotion video may alternatively be displayed on the partial area of the information stream interface.

In some exemplary embodiments, in response to a first trigger operation on the first area, the promotion video is closed, and the information stream interface is switched to an information recommend interface.

For example, the trigger operation may be an operation such as clicking/tapping, sliding, or dragging. The first trigger operation and the following second and third trigger operations may be operations performed in a same mode.

Figure 6D:
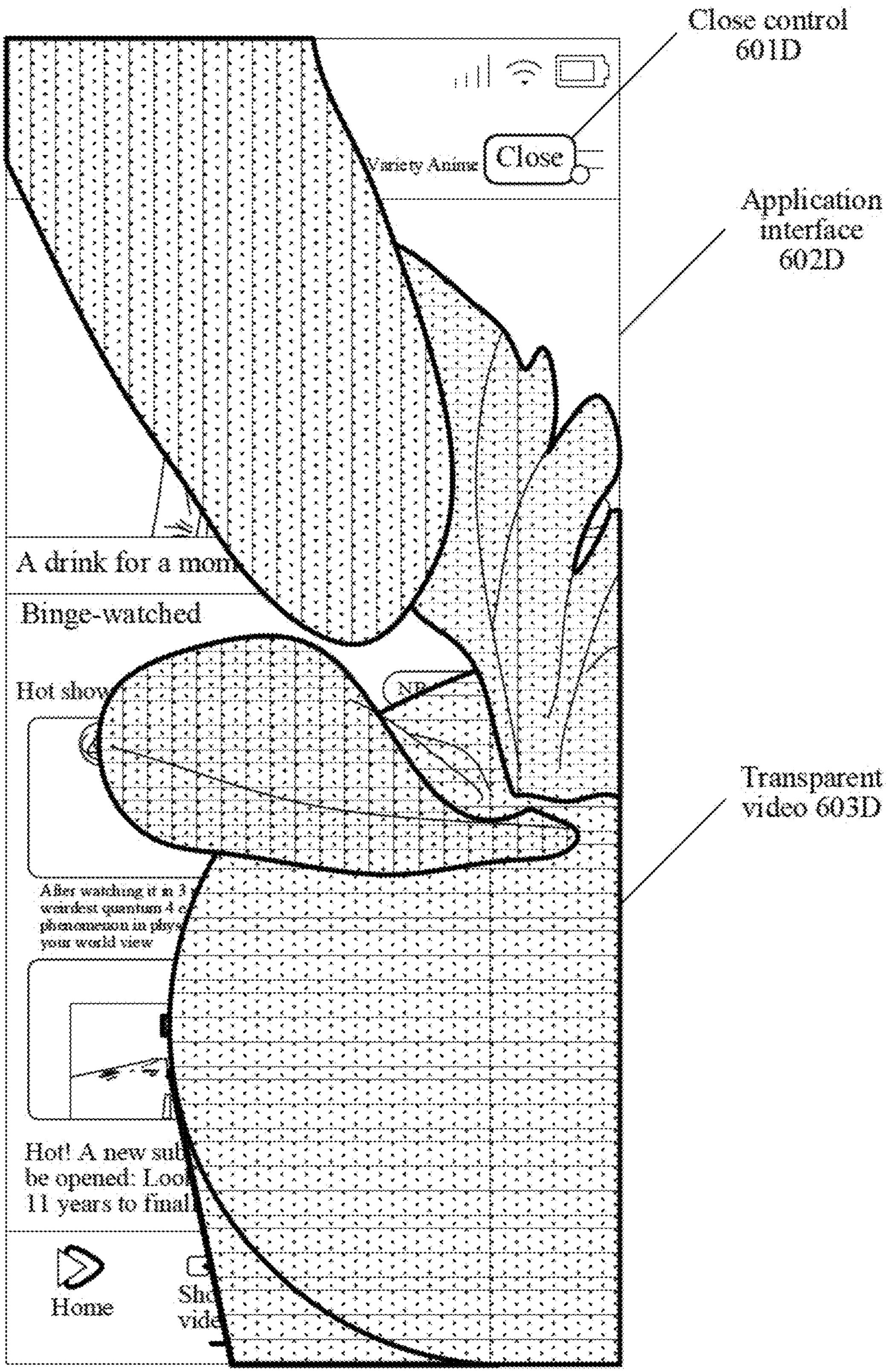
FIG. 6D is a schematic diagram IV of an application interface according to an exemplary embodiment of this disclosure.
Figure 6E:
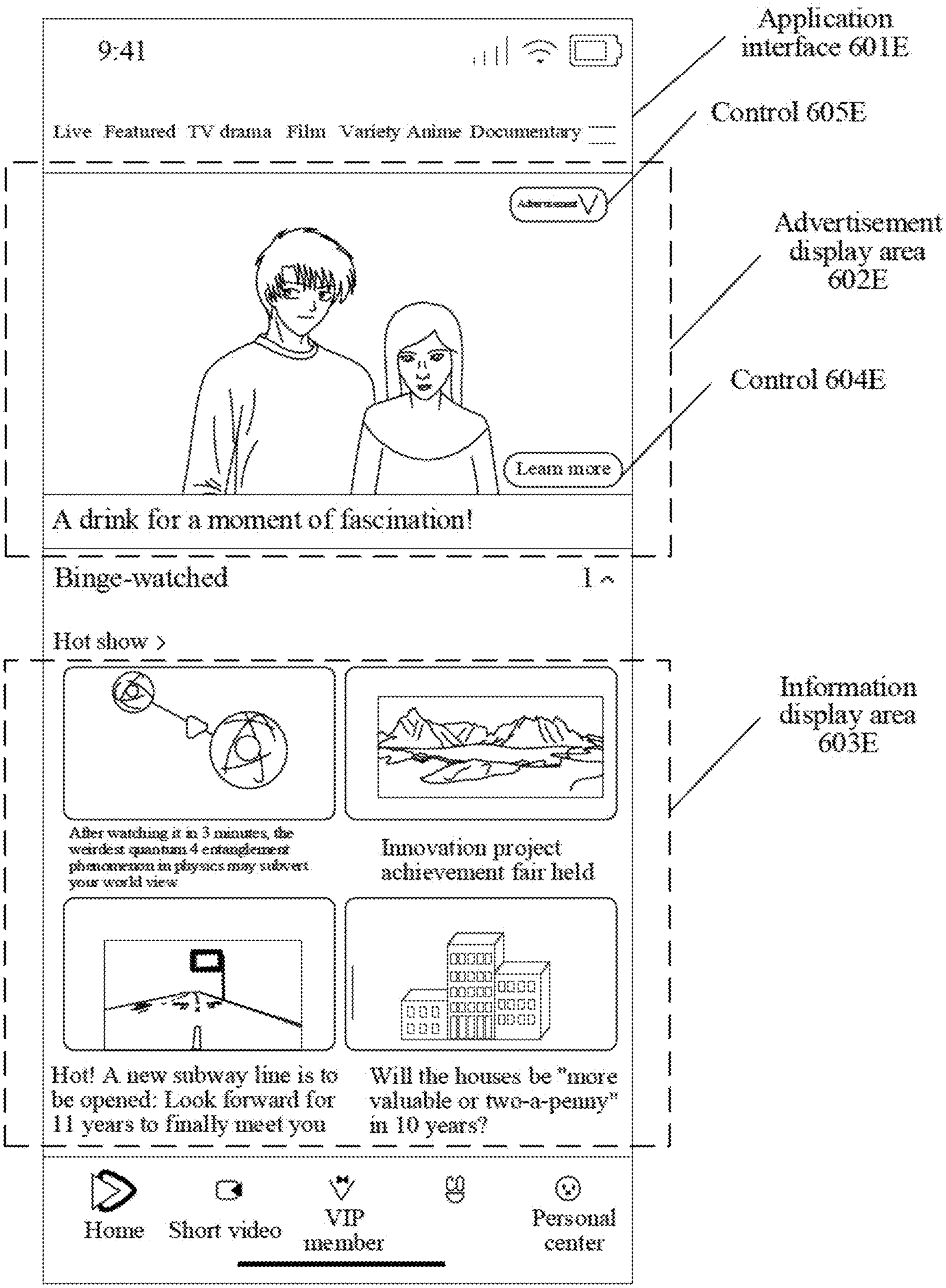
FIG. 6E is a schematic diagram V of an application interface according to an exemplary embodiment of this disclosure.

For example, the information recommend interface may be within a current application or content of a third-party application. For example, the video is an advertisement video, configured for recommending a product, and the information recommend interface is a product recommend interface in a shopping application other than a current application. The information recommend interface includes related information of a material, and the information recommend interface may be an introduction page or a purchase page; the related information may be recommend information (for example, advertising words) or detailed information (for example, product explanation text, a picture, a video). FIG. 6G is a schematic diagram VII of an application interface according to an exemplary embodiment of this disclosure. A product recommend interface 602G displays a product display picture 601G associated with content of a video, and detailed information of the product.

In some exemplary embodiments, the promotion video is closed and the information stream interface is switched to an information display interface in response to a second trigger operation on the second area, and media information corresponding to a trigger position of the second trigger operation in the information stream is displayed in the information display interface.

For example, if the second area is displayed in a transparent mode, information in the information stream interface may be revealed through the second area, and the information display interface may be configured to display details of the information or a brief of the information.

Figure 3B:
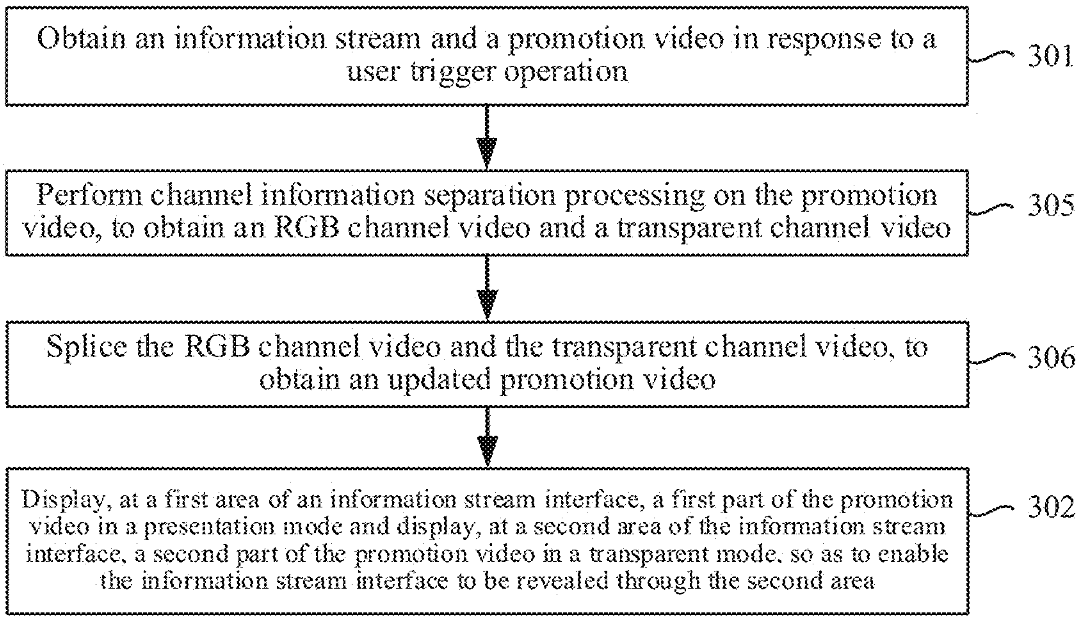
FIG. 3B is a schematic flowchart II of an information processing method according to an exemplary embodiment of this disclosure.
Figure 3C:
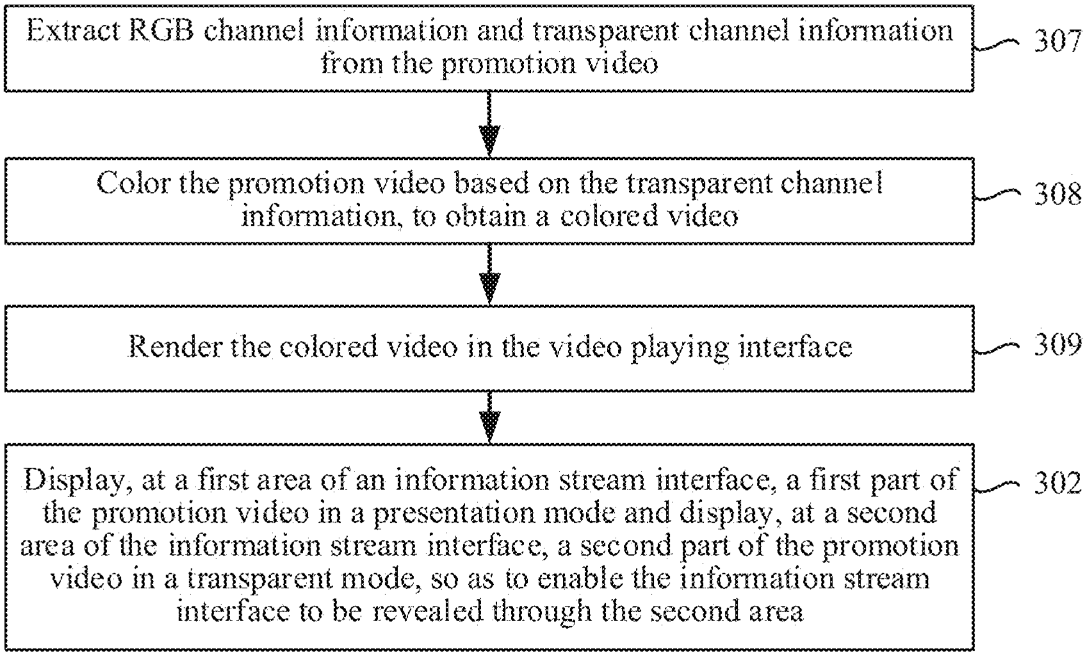
FIG. 3C is a schematic flowchart III of an information processing method according to an exemplary embodiment of this disclosure.
Figure 3D:
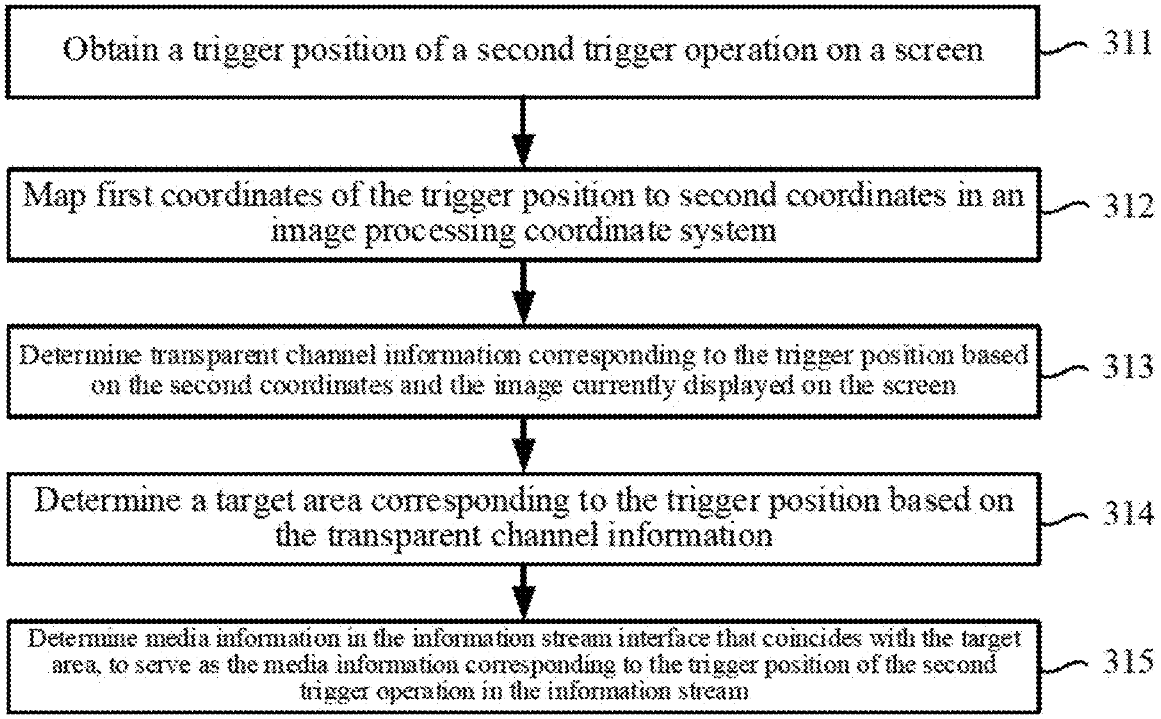
FIG. 3D is a schematic flowchart IV of an information processing method according to an exemplary embodiment of this disclosure.

In some exemplary embodiments, before the media information corresponding to the trigger position of the second trigger operation in the information stream is displayed in the information display interface, as shown in FIG. 3D, which a schematic flowchart IV of an information processing method according to an exemplary embodiment of this disclosure, the media information corresponding to the trigger position of the second trigger operation in the information stream is determined by using the following operation 311 to operation 315, which are described in detail below.

Operation 311: Obtain a trigger position of a second trigger operation on a screen.

For example, the trigger position may be determined by using a sensor disposed inside a terminal device.

Operation 312: Map first coordinates of the trigger position to second coordinates in an image processing coordinate system.

For example, a coordinate position in the image processing coordinate system corresponds to the image displayed on the screen. The image processing coordinate system may be a vertex coordinate system of an open graph library (GL), coordinates in the image processing coordinate system may be referred to as texture coordinates (second coordinates), and coordinate values corresponding to the texture coordinates are four-dimensional. It is assumed that the coordinate values of the second coordinates are (vTexCoordinate.x, vTexCoordinate.y, vTexCoordinate.z, vTexCoordinate.w).

Operation 313: Determine transparent channel information corresponding to the trigger position based on the second coordinates and the image currently displayed on the screen.

For example, a degree of transparency of the second coordinates can be obtained by using the following formula (a degree of transparency of the texture coordinates, a value of which is greater than 0, or less than or equal to 0):

```
Texture Coordinate Alpha=vec2
    (((textureTransform*vec4(vTexCoordinate.x/
    3.0+0.75,vTexCoordinate.y,vTexCoordinate.z,
    vTexCoordinate.w))).x,
    (textureTransform*vTexCoordinate).y).
```

Here, Texture Coordinate Alpha is the degree of transparency of the texture coordinates (the second coordinates), vec2 is a two-dimensional vector function, and vec4 is a four-dimensional vector function, textureTransform characterizes texture conversion processing. The degree of transparency of the second coordinates has the following mapping relationship with the transparent channel information of the trigger position: If the degree of transparency of the second coordinates is greater than 0, an alpha value in the transparent channel information of the trigger position is 1, the trigger position is in an opaque area; and if the degree of transparency of the second coordinates is less than 0 or equal to 0, an alpha value in the transparent channel information of the trigger position is not 1 and the trigger position is in a transparent area.

Operation 314: Determine a target area corresponding to the trigger position based on the transparent channel information.

For example, when the alpha value of the transparent channel information of the trigger position is 1, the area where the trigger position is located is opaque and is a first area, and the first area serves as the target area; and when the alpha value of the transparent channel information of the trigger position is not 1, the area where the trigger position is located is displayed in a transparent mode and is a second area, and the second area serves as the target area.

Operation 315: Determine media information in the information stream interface that coincides with the target area, to serve as the media information corresponding to the trigger position of the second trigger operation in the information stream.

For example, for ease of explanation, a description is provided with reference to the accompanying drawings. Still referring to FIG. 6B, target information 603B is the media information. The target information 603B marked by a dashed box is in the second area. When the trigger position is in the dashed box corresponding to the target information 603B, it is determined based on above operation 311 to operation 315 that there is no blocking content above the target information 603B in the current video, the second area is in a transparent state, and a position of the target information 603B coincides with the position of the second area. In this case, the promotion video is to be closed, and the information stream interface is switched to an information display interface corresponding to the target information 603B. The information display interface is an interface in an application.

In this exemplary embodiment of this disclosure, the area where the trigger position is located is determined by using the degree of transparency of the trigger position, and the media information pointed to by the trigger position is determined according to the area where the trigger position is located, so that media information at a lower layer is triggered by a promotion video at an upper layer during playing of the promotion video. Therefore, a related operation by a user on an information stream is not affected during watching of the promotion video, and the human-machine interaction efficiency can be improved.

In some exemplary embodiments, in response to a third trigger operation on any area in the promotion video, the promotion video is closed, and the information stream interface is switched to the information recommend interface.

For example, the information recommend interface includes related information of a material, and the related information may be recommend information (for example, advertising words) or detailed information (for example, product explanation text, a picture, a video). The any area may be any one of the first area and the second area. When the first area or the second area is triggered, the promotion video can be closed and the information stream interface can be switched to the information recommend interface. Still referring to FIG. 6B, an explanation is provided. For example, in a picture corresponding to FIG. 6B, any area other than a control in a video is clicked/tapped, to turn to a product recommend interface corresponding to the promotion video.

In some exemplary embodiments, the information recommend interface corresponding to the promotion video is displayed in response to a fourth trigger operation for the terminal device that displays the promotion video.

For example, the fourth trigger operation is a somatosensory operation, for example, a gesture operation for a terminal device, or a shaking operation for a terminal device.

In some exemplary embodiments, the promotion video is closed in response to that a video closing condition is met.

For example, closing a promotion video means turning off the video playing interface that plays the promotion video, and can be implemented in the following methods: hiding the video playing interface and a control above the video playing interface, to completely display the information stream interface. The video closing condition includes any of the following: a playing time corresponding to the promotion video arrives, or a close control in the video playing interface is triggered.

In some exemplary embodiments, after the video playing interface is closed in response to that the video closing condition is met, the video playing interface is loaded in the information stream interface.

For example, the video playing interface is configured to continue to play a video or another video. FIG. 6E is a schematic diagram of an application interface according to an exemplary embodiment of this disclosure. An information display area 603E in an application interface 601E is configured to display an information stream. The information stream includes a plurality of pieces of information. A video playing interface is loaded in an advertisement display area 602E, and is configured to play an advertisement video related to a screen-on video or another advertisement video. The video includes a control 605E and a control 604E. When the control 605E is triggered, playing of an advertisement video stops or the video playing interface is closed. When the control 604E is triggered, a product display interface corresponding to the advertisement video is turned to from the application interface 601E.

In some exemplary embodiments, a directly obtained promotion video may be data that cannot be directly called by a video playing interface of a terminal device, and the data may be converted to adapt to the terminal device. FIG. 3B is a schematic flowchart II of an information processing method according to an exemplary embodiment of this disclosure. Before operation 302, the following operation 305 to operation 306 are performed, which are described in detail below.

Operation 305: Perform channel information separation on the promotion video, to obtain an RGB channel video and a transparent channel video.

For example, the RGB channel video and the transparent channel video have identical picture sizes and identical video durations. It is assumed that the video is an advertisement video, a video having transparent channel information delivered by an advertiser may be in a format that is not supported by a video player of a terminal device, for example, a video in a MOV format. The channel information separation may be performed on the video, to obtain an RGB channel video and a transparent channel video, and format conversion is performed on the RGB channel video and the transparent channel video, to obtain a video in a format that can be directly read by the video player of the terminal device, for example, a MP4 format.

Figure 7A:
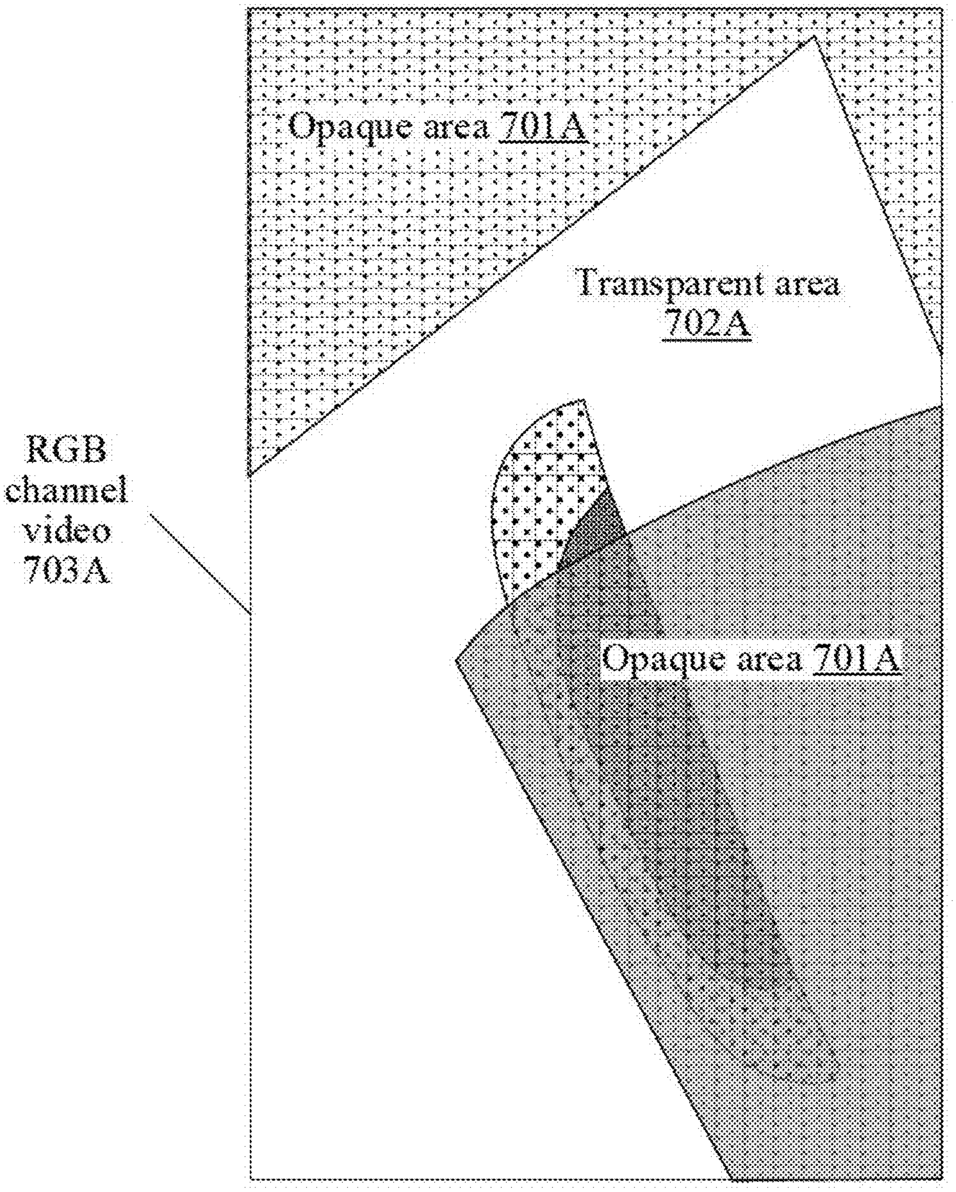
FIG. 7A is a schematic diagram I of a video frame according to an exemplary embodiment of this disclosure.
Figure 7B:
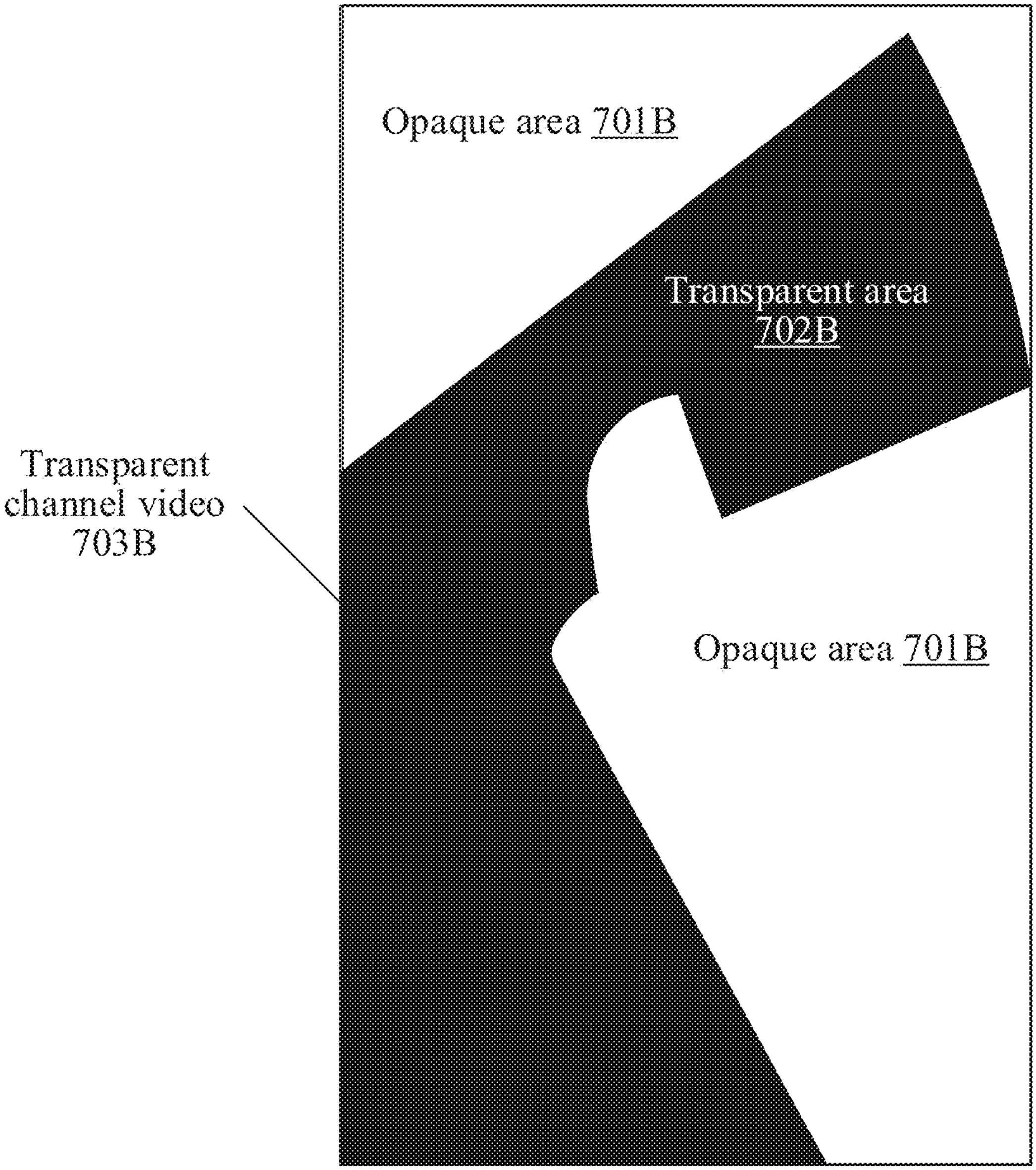
FIG. 7B is a schematic diagram II of a video frame according to an exemplary embodiment of this disclosure.

FIG. 7A is a schematic diagram I of a video frame according to an exemplary embodiment of this disclosure. FIG. 7A is configured for characterizing an RGB channel video (an RGB channel video 703A) obtained by separating a video carrying a transparent channel. A shaded area is configured for characterizing a material in the video, and corresponds to an opaque area 701A. A blank area is a transparent area 702A. Pixels of the RGB channel video do not carry transparent information. An area corresponding to the transparent area in a video frame is characterized as blank. FIG. 7B is a schematic diagram II of a video frame according to an exemplary embodiment of this disclosure. FIG. 7B is configured for characterizing a transparent channel video 703B obtained by separating a video carrying a transparent channel. A blank area is configured for characterizing a material in the video, and corresponds to an opaque area 701B. A black area is a transparent area 702B. Pixels of the transparent channel video 703B do not carry RGB channel information, and only have transparent channel information. An area corresponding to the opaque area in a video frame is characterized as blank.

Operation 306: Splice the RGB channel video and the transparent channel video, to obtain an updated promotion video.

For example, the updated promotion video is rendered into a video playing interface. A splicing process is to splice an RGB channel video and a transparent channel video respectively as two parallel video tracks into a same video. For example, the RGB channel video and the transparent channel video in the MP4 format respectively serve as two video tracks and are spliced into a same MP4 video, which serves as the updated promotion video. A video in the format can be directly read by the video player of the terminal device.

In some exemplary embodiments, before operation 306, the transparent channel video is compressed in the following methods: obtaining transparent channel information corresponding to each pixel of each video frame in the transparent channel video; grouping all pixels in each video frame into a plurality of pixel groups, wherein each pixel group includes a plurality of pixels, and the pixels in the pixel group are adjacent to each other; and for each pixel group, filling transparent channel information of the plurality of pixels in the pixel group into a transparent channel of a same pixel in the pixel group, so as to obtain a compressed transparent channel video.

For example, the transparent channel information of each pixel may be characterized as the following sequence [ai, 0, 0], wherein ai is transparent information corresponding to an ith pixel in the video frame, and i is a positive integer. A plurality of adjacent pixels are grouped into a same pixel group. For example, three adjacent pixels are grouped into a same pixel group. A sequence corresponding to the pixel group may be characterized as [ai, 0, 0, ai+1, 0, 0, ai+2, 0, 0], and transparent information respectively corresponding to the three pixels is filled to a sequence corresponding to a same pixel, which may be represented as [ai, ai+1, ai+2]. The foregoing processing is performed for each pixel group, to obtain a compressed transparent channel video, and splicing processing is performed on the compressed transparent channel video and the RGB channel video, to obtain an updated video.

In the exemplary embodiments of this disclosure, by compressing the video carrying the transparent channel information, the volume of the video is reduced, the video is conveniently loaded quickly, the computing resources required for loading the video are saved, and the loading efficiency is improved.

In some exemplary embodiments, operation 305 to operation 306 may be performed by the recommend server 200 before operation 301, and the recommend server 200 transmits the updated video to the terminal device 400, so that the terminal device 400 can quickly load the video.

In some exemplary embodiments, FIG. 3C is a schematic flowchart III of an information processing method according to an exemplary embodiment of this disclosure. Before operation 302, the following operation 307 to operation 309 are performed, which are described in detail below.

Operation 307: Extract RGB channel information and transparent channel information from the promotion video.

For example, the transparent channel information corresponds to the second area. If the first area for displaying the material is displayed as non-transparent, an area without a material other than the first area is the second area, and the second area is displayed in a transparent state, an interface at a next layer can be observed through the layer of the video playing interface.

For example, operation 307 to operation 309 may be performed based on processing results of operation 305 to operation 306. A description is continuously provided with an example based on operation 305 to operation 306. For example, after the updated promotion video in the MP4 format is obtained, the RGB channel information and the transparent channel information may be obtained by extracting video tracks respectively corresponding to the transparent channel information and the RGB channel information in the promotion video.

Operation 308: Color the promotion video based on the transparent channel information, to obtain a colored video.

For example, the coloring may be implemented in the following methods. For each video frame in the video, a shader of the video player in the terminal device is invoked to restore, based on the transparent channel information, a degree of transparency corresponding to distribution of the areas in the video frame, so that a corresponding transparent area and a corresponding non-transparent area are formed in the video frame. After coloring is performed on each video frame, a transparent video (colored video) in which a transparent area changes synchronously along with changes of the positions of the materials in the video can be obtained.

Operation 309: Render the colored video in the video playing interface.

For example, the RGB video and the transparent information video corresponding to the materials are parsed from the video, the transparent channel in the transparent information video is colored and restored, and the colored video undergone coloring and restoring is rendered to the video playing interface, wherein the video playing interface is configured for play the colored video above the information stream interface.

In some exemplary embodiments, at least one of the materials displayed in the first area meets a matching condition, wherein the matching condition includes at least one of the following: including at least one of the following types of materials in a picture of the video:

Type 1: A material having a ratio of an imaging size thereof to a screen size being within a set ratio interval. For example, a material of a suitable size is displayed in the first area, that is, the imaging size and the screen are within the set ratio interval, so as to avoid blocking caused by excessive display.

Type 2: A material having an association with the media information in information stream and revealed through the second area.

For example, the association includes that: information revealed through the second area includes content related to the material. Feature extraction may be performed on the material and the information stream in advance to obtain corresponding feature information respectively, and matching processing is performed on the feature information, to determine whether there is a correlation between the feature information of the material and the information stream. For example, if current information in the information stream introduces popular science knowledge related to weight loss, the displayed video shows content related to weight loss such as weight loss food and fitness equipment, and does not show content, such as high-temperature food, having less correlation with weight loss.

Type 3: A material of which a material feature has a similarity with an interest feature of a current login account of the information stream interface.

For example, having similarity means that the similarity between the material feature and the interest feature is greater than a similarity threshold. The current login account is an account configured for logging into the application corresponding to the information stream interface, the interest feature may be determined by using clicking/tapping records and browsing records of different information by the current login account, and the material feature may be determined by performing image recognition on the material.

For example, information in a clicking/tapping record of the current login account having a clicking/tapping rate exceeding a particular value is regarded as information of interest of the current login account, and feature extraction is performed on the information, to obtain an interest feature. Image recognition is performed on the material, to obtain a parameter such as an entity name corresponding to the material. The feature extraction is performed based on an image recognition result, to obtain a material feature corresponding to the material. A similarity between the material feature and the interest feature is obtained through a similarity algorithm (for example, a cosine similarity calculation formula). When the similarity is greater than a preset similarity, the material feature of the material is similar to the interest feature of the current login account of the information stream interface.

In some exemplary embodiments, before operation 302, the material displayed in the video may be determined in the following methods: performing feature extraction on each of the materials, to obtain a material feature of the material; obtaining an object feature of an object using an application, and obtaining a degree of similarity between each material feature and the object feature; sorting each material in descending order based on the degrees of similarity, to obtain a list sorted in the descending order; and selecting, from a top position of the list sorted in the descending order, at least one of the materials for displaying in the first area.

For example, the object may be an account or a user, and the object feature may be a feature corresponding to an account for logging into the application and may be obtained by performing feature extraction from on a browsing record corresponding to the account. The method for obtaining the similarity may include calculating a cosine similarity between the material feature and the object feature. It is assumed that the promotion video pushed by the recommend server to the terminal device includes N materials, wherein N is a positive integer. Similarities between the material features and the object features are sorted in descending order, to obtain the following list sorted in the descending order: a material N, a material 2, a material 5, . . . , a material 3. If three materials are selected, from a top position in the list sorted in the descending order, as the materials displayed in the video, the material N, the material 2, and the material 5 are obtained through selection. The other materials are discarded and only the material N, the material 2, and the material 5 are displayed in the video.

In the exemplary embodiments of this disclosure, based on the similarity between the object feature and the material feature, materials having higher similarities and more matching a recommend requirement of a user are selected. Compared with customization of a promotion video for the user, on the one hand, the technical resources required for displaying a large amount of materials are saved, and on the other hand, the materials more matching the requirement are recommended to the user, thereby improving the feeling of watching of the video and the recommend effect.

In some exemplary embodiments, the information stream and the promotion video are drawn by a sub-thread of a processor, and a main thread of the processor is configured to render the information stream interface and the promotion video above at least a partial area of the information stream interface.

For example, the processor is a processor of a terminal device, and the sub-thread is an independent thread, can independently complete a drawing task, and does not conflict with a task currently executed by other threads. The information stream and video drawn by the sub-thread are content displayed in the interface. A loading process can be allocated to different threads for processing by drawing the content by the sub-thread and displaying the drawn content by the main thread. The threads are independent, and therefore drawing and rendering can be performed synchronously.

In the exemplary embodiments of this disclosure, the video in the video playing interface is displayed in the information stream interface of the application in a mode of asynchronous rendering, the possibility of the application being stuck is reduced by task shunting between the threads, the smoothness of the interface for browsing the application is improved, and the computing resources of the terminal device are saved.

In the exemplary embodiments of this disclosure, the video in the video playing interface is displayed on the information stream interface in a presentation mode and a transparent mode, to implement video insertion in the information stream interface and enrich display modes of the video in a process of displaying the information stream, so that part of the information stream can be displayed through the transparent area in the video, the blocking of the information stream is reduced, the impact on the experience of watching the information stream is reduced, and meanwhile the attractiveness of the video material is increased and the effect of video recommend processing can be improved. The video and information stream are displayed in an asynchronous rendering mode, so that sticking formed during loading of the video in the process of displaying the information stream is reduced, the pressure on the running internal memory of the application is alleviated, and the computing resources are saved.

The following describes an exemplary application of the information processing method according to an exemplary embodiment of this disclosure in a practical application scenario.

At present, a splash screen advertisement is configured for screen-on displaying. When an orientation and a recommend logic are met, text, a picture, or a video is displayed to a user. If the user is interested in it, the user may enter the advertisement display interface by triggering a material at an outer layer. For a conventional splash screen advertisement and information stream advertisement, text, a picture, or a video is taken as a material at an outer layer, which only plays a display role and lacks a motivation for attracting a user to click/tap actively and generating an advertisement conversion. In the solution in the related art, the display modes are undiversified, an interaction with a user is deficient, an advertisement blocks an interface of an application or an advertisement is only located in a part of an interface of the application, the visual experience is poor, and therefore the user experience is poor. The information processing method provided in the exemplary embodiments of this disclosure provides a method for displaying a video in an information stream interface, so that the visual effect of the video is improved and the user experience is improved.

Figure 5:
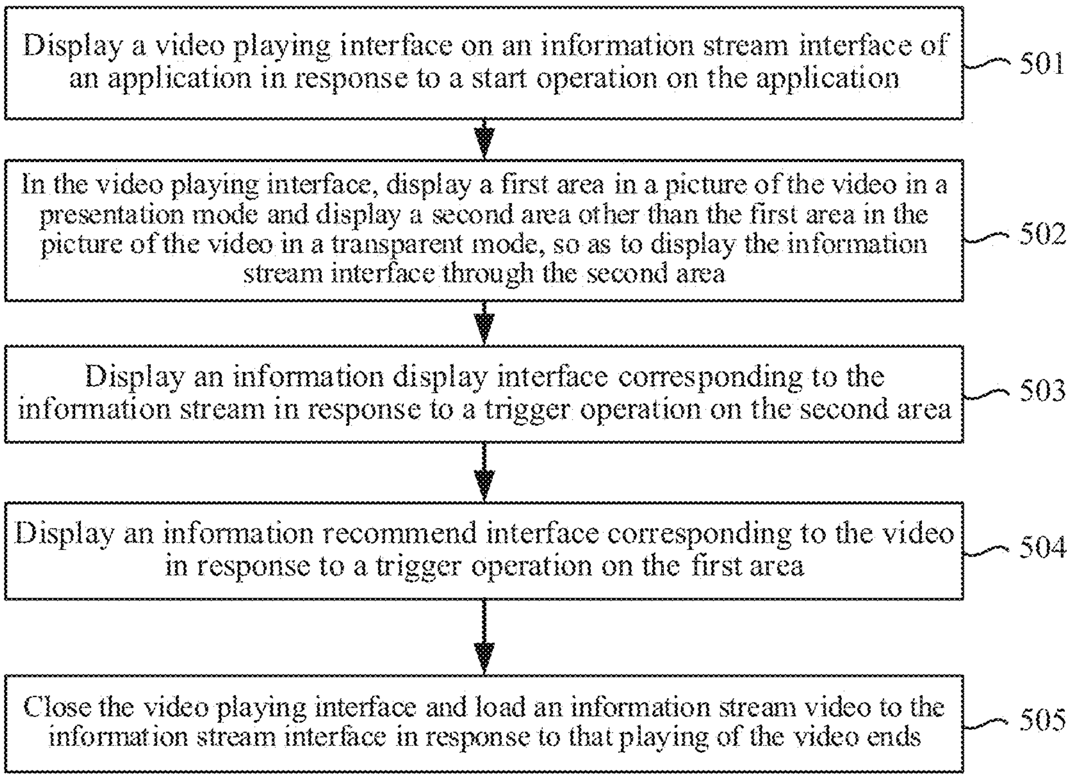
FIG. 5 is a schematic diagram of an optional process of an information processing method according to an exemplary embodiment of this disclosure.

FIG. 5 is a schematic diagram of an optional process of an information processing method according to an exemplary embodiment of this disclosure. The terminal device 400 in FIG. 1 is taken as an execution body, and an explanation is provided in combination with the operations in FIG. 5.

Operation 501: Display a video playing interface on an information stream interface of an application in response to a start operation on the application.

For example, FIG. 6A is a schematic diagram I of an application interface according to an exemplary embodiment of this disclosure. A video shown in the video playing interface may be a full-screen video 602A, the video playing interface and the information stream interface have the same size, and the full-screen video 602A blocks the entire information stream interface. There are a plurality of controls displayed in the full-screen video 601A, including: a skip control 601A (configured for skipping a screen-on video) and a sound control 604A (configured for turning off or turning on sounds of a video). Prompt information 603A "Click/tap to turn to a details page or a third-party application" is configured for prompting a user to enter a product display interface by triggering the video, for example, clicking/tapping any area in the video or sliding any area in the video, to turn to the product display interface.

Operation 502: In the video playing interface, display a first area in a picture of the video in a presentation mode and display a second area other than the first area in the picture of the video in a transparent mode, so as to display the information stream interface through the second area.

For example, the video played in the video playing interface may be a transparent video. FIG. 6B is a schematic diagram II of an application interface according to an exemplary embodiment of this disclosure. A transparent video 602B is displayed above the application interface 601B. FIG. 6C is a schematic diagram III of an application interface according to an exemplary embodiment of this disclosure. FIG. 6C is a parsing diagram of FIG. 6B. A size of the transparent video 602B is the same as a size of the application interface 601B (information stream interface) and is overlapped on the application interface 601B. A shaded area in the transparent video 602B is an opaque area 601C, and a blank area is a transparent area 602C.

FIG. 4 is a schematic diagram of a hierarchical structure according to an exemplary embodiment of this disclosure. A picture displayed on a screen of a terminal device is formed by superimposing images of a plurality of levels, and the levels are sequentially a control 401, a video playing interface 402, and an information stream interface 403 from top to bottom. The information stream interface 403 is an interface corresponding to an application.

By displaying the video playing interface above the information stream interface, a visual effect of displaying content of the information stream below through the transparent area in the video playing interface is formed.

In some exemplary embodiments, during video delivery by an advertiser, a video provided thereby may be a video carrying transparent channel information, for example, a video in a MOV format. However, a video in the format is difficult to be directly compatible with a player of a terminal device, and a volume of a video in the MOV format is large (for example, the volume of a video of a few seconds is of megabytes), which may result in that loading of a screen-on video is difficult to complete in a short time, and therefore forming a sticking.

Videos that are suitable for use as screen-on videos may be obtained in the following methods. For example, channel separation is performed on a video in a MOV format through an open source tool library (Fast Forward Mpeg, FFmpeg) for processing audios and videos, to obtain a video file of RGB channel information and a video file of transparent channel information. A terminal device may directly read the two video files (for example, video files in an MP4 format).

The two video files are spliced as parallel video tracks to form an updated video file including the RGB channel information and the transparent channel information, and the updated video file can be directly read by the terminal device.

FIG. 7A is a schematic diagram of a video frame according to an exemplary embodiment of this disclosure. FIG. 7A is configured for characterizing an RGB channel video (an RGB channel video 703A) obtained by separating a video carrying a transparent channel. A shaded area is configured for characterizing a material in the video, and corresponds to an opaque area 701A. A blank area is a transparent area 702A. Pixels of the RGB channel video do not carry transparent information. An area corresponding to the transparent area in a video frame is characterized as blank. FIG. 7B is a schematic diagram of a video frame according to an exemplary embodiment of this disclosure. FIG. 7B is configured for characterizing a transparent channel video 703B obtained by separating a video carrying a transparent channel. A blank area is configured for characterizing a material in the video, and corresponds to an opaque area 701B. A black area is a transparent area 702B. Pixels of the transparent channel video 703B do not carry RGB channel information, and only have transparent channel information. An area corresponding to the opaque area in a video frame is characterized as blank.

The terminal device loads the updated video file, reads the processed video file by using a video player, decodes the video file, performs reprocessing (shader transparent channel restoration) on decoded information by using an open graphics library (OpenGL), to render same to a canvas of the terminal, and finally obtains a video having a same original transparent effect. When the application is started, the canvas maps the video to a screen of the terminal for displaying, thereby forming an effect of a transparent video. The OpenGL is a cross-language, cross-platform application programing interface for rendering 2D and 3D vector graphs.

In some exemplary embodiments, the efficiency of loading of the video may be improved by performing volume compression on the screen-on video, which is described below with reference to an example.

It is assumed that pixel information of a plurality of pixels corresponding to any video frame before compression is arranged as follows:

r1 g1 b1|r2 g2 b2|r3 g3 b3|a1 0 0|a2 0 0|a3 0 0.

In the above sequence, r1 g1 b1|r2 g2 b2|r3 g3 b3 characterizes RGB channel information, and a1 0 0|a2 0 0|a3 0 0 characterizes transparent channel information. The compression processing is implemented in the following method: For transparent channel information of every three pixels in each video frame, the transparent channel information respectively corresponding to the three adjacent pixels is filled into an alpha channel of a same pixel, to obtain a compressed pixel information arrangement.

Through the above compression, pixel information obtained is arranged as follows: r1 g1 b1|r2 g2 b2|r3 g3 b3|a1 a2 a3.

In some exemplary embodiments, during startup of an application, system resource preemption may occur between a splash screen scenario and other initialization tasks of the application (for example, loading an application interface, or loading a cover picture of a video in an information stream), in the exemplary embodiments of this disclosure, an asynchronous rendering method of a Surface View is configured for reducing sticking caused by resource preemption by the main thread. The asynchronous rendering includes drawing an image (surface view) in a sub-thread and then displaying, in the main thread, the image drawn by the sub-thread.

The rendering of surface view may be handled in a separate thread, and each surface view has a different graph library context (GLcontext) during rendering. Because the rendering processing of the sub-thread does not affect a response time corresponding to the main thread, drawing can be performed in an independent thread without affecting the main thread, and a double buffering mechanism is used, pictures during playing of the video is smooth. If a window position of the Surface View component is updated synchronously with rendering processing of other components, panning and zooming the surface view on a screen does not cause rendering distortion or sticking.

In this exemplary embodiment of this disclosure, a function of playing a video is implemented during splash screen turning of an information stream, and by performing compression processing on the transparent channel data of the transparent video and by processing the transparent video in an asynchronous rendering mode during startup of the application, playing and turning sticking are resolved.

Operation 503: Display an information display interface corresponding to the information stream in response to a trigger operation on the second area.

For example, the information display interface may be a content details page corresponding to the information in the information stream. FIG. 6D is a schematic diagram IV of an application interface according to an exemplary embodiment of this disclosure. A transparent video 603D includes a transparent area and an opaque area (a shaded part). The transparent area reveals an application interface 602D at a lower layer. In response to that information corresponding to the application interface 602D is triggered, an information display interface corresponding to the information is turned to. In response to that the opaque area is triggered, the promotion video is closed and the information stream interface is switched to an information recommend interface corresponding to the transparent video 603D.

Operation 504: Display an information recommend interface corresponding to the video in response to a trigger operation on the first area.

For example, the video playing interface is configured to play a promotion video, for example, an advertisement video. The information recommend interface may be a product display interface of a product corresponding to the advertisement video. In this exemplary embodiment of this disclosure, when playing a transparent video carrying a transparent channel, responding to different click/tap events can be implemented by determining whether a triggered area in the video is currently transparent, and whether a content details page or an advertisement display interface is turned to can be determined. FIG. 6G is a schematic diagram of an application interface according to an exemplary embodiment of this disclosure. A product recommend interface 602G displays a product display picture 601G associated with content of a video, and related information of the product.

In some exemplary embodiments, the materials in the transparent video are dynamic and the positions of the materials continuously change, and therefore it is difficult to determine, based on a fixed coordinate position, whether a current area is transparent. Whether a trigger position corresponding to a trigger operation is in a transparent area may be determined in the following method, which is described in detail below.

A corresponding trigger position of the trigger operation on the screen is obtained, corresponding position coordinates of the trigger position on the screen is mapped to position coordinates, vTexCoordinate, in a vertex coordinate system of an open graph library (GL), and it is assumed that coordinate values thereof are (vTexCoordinate.x, vTexCoordinate.y, vTexCoordinate.z, vTexCoordinate.w)

The degree of transparency of the current click/tap point (trigger position) may be obtained in the following calculation method:

$$\text{Texture Coordinate Alpha} = vec2(((textureTransform * vec4(vTexCoordinate.x/3.0 + 0.75, vTexCoordinate.y, vTexCoordinate.z, vTexCoordinate.w))).x, (textureTransform * vTexCoordinate).y).$$

Here, Texture Coordinate Alpha is the degree of transparency of the transparent channel of the texture coordinates, vec2 is a two-dimensional vector function, and vec4 is a four-dimensional vector function, textureTransform characterizes texture conversion processing.

When the degree of transparency of the texture coordinate is greater than 0, the current trigger position is in an opaque area. On the contrary, the degree of transparency of the texture coordinate is less than 0, and the current trigger position is in the transparent area. Related interface switching may be performed based on the area corresponding to the trigger position.

Operation 505: Close the video playing interface and load an information stream video to the information stream interface in response to that playing of the video ends.

For example, operation 503 to operation 504 are performed in any order; if operation 503 to operation 504 are not executed, operation 505 is turned to. FIG. 6E is a schematic diagram V of an application interface according to an exemplary embodiment of this disclosure. An information display area 603E in an application interface 601E is configured to display an information stream. The information stream includes a plurality of pieces of information. A video playing interface is loaded in an advertisement display area 602E, and is configured to play an advertisement video related to a screen-on video or another advertisement video. The video includes a control 605E and a control 604E. When the control 605E is triggered, playing of an advertisement video stops or the video playing interface is closed. When the control 604E is triggered, a product display interface corresponding to the advertisement video is turned to from the application interface 601E.

Figure 6F:
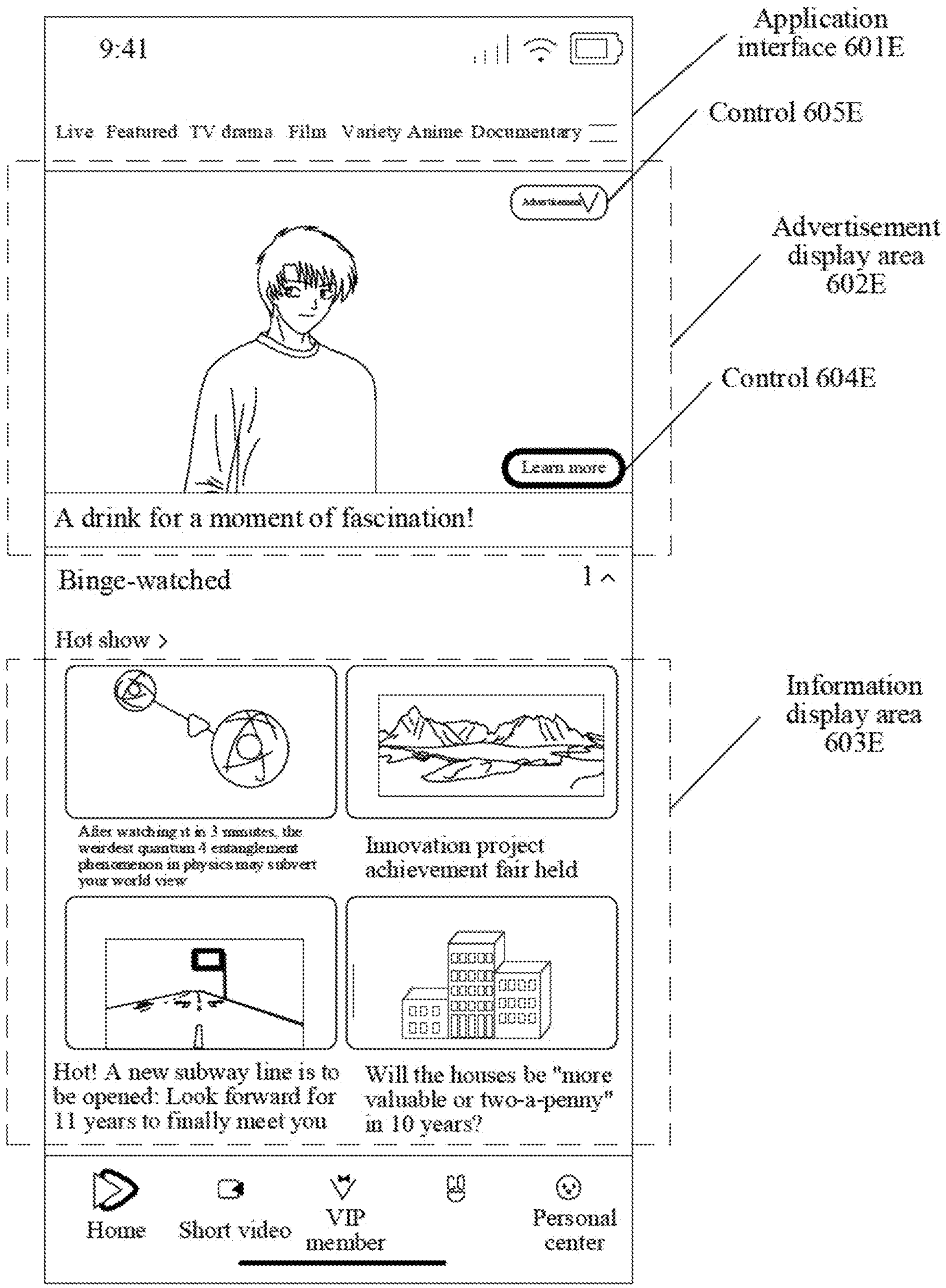
FIG. 6F is a schematic diagram VI of an application interface according to an exemplary embodiment of this disclosure.
Figure 6G:
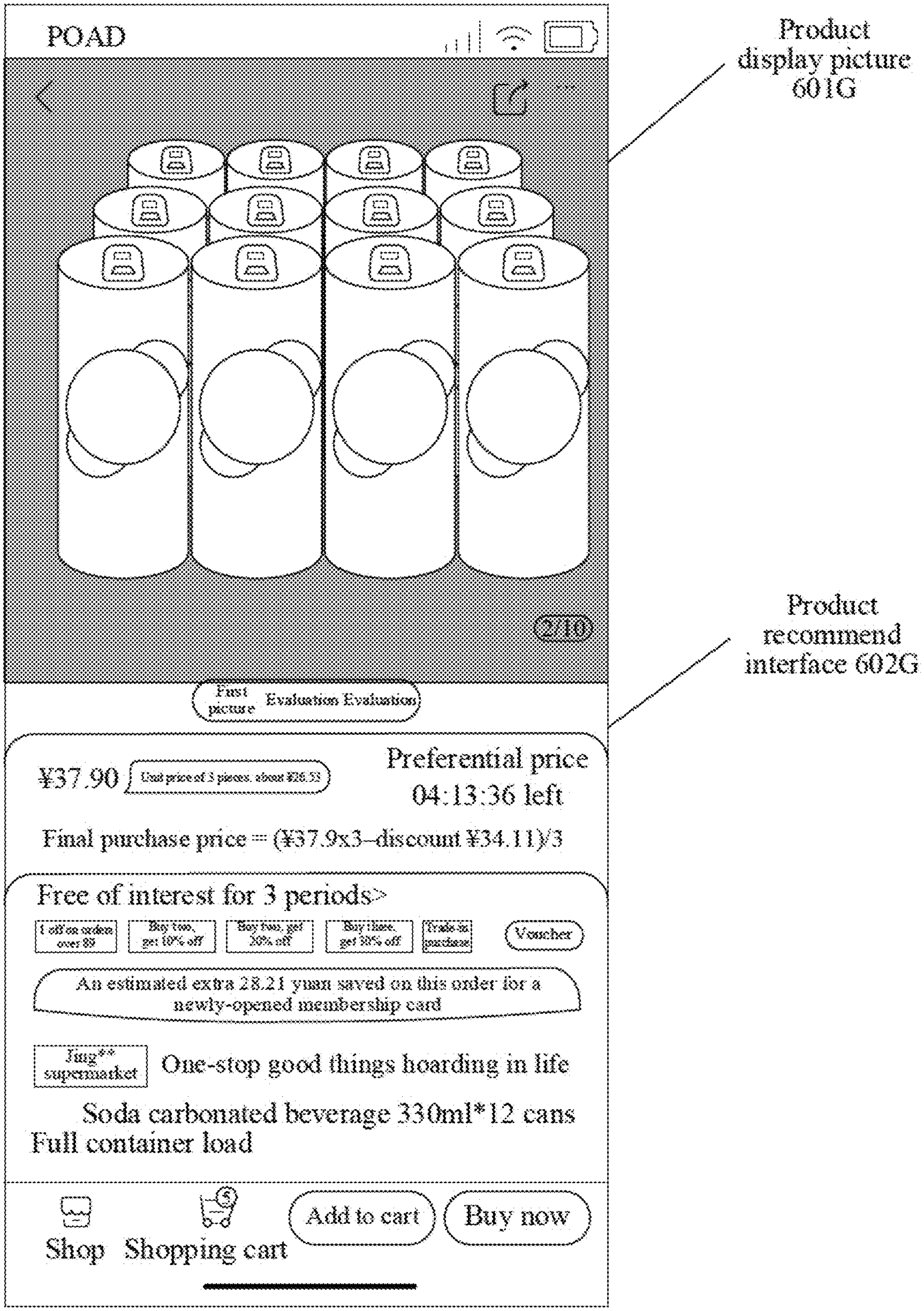
FIG. 6G is a schematic diagram VII of an application interface according to an exemplary embodiment of this disclosure.

In some exemplary embodiments, FIG. 6F is a schematic diagram VI of an application interface according to an exemplary embodiment of this disclosure. When playing of the advertisement video in FIG. 6E is completed, the control 604E for performing interface turnover is highlighted to attract the attention of a viewer and promote a click behavior.

In this exemplary embodiment of this disclosure, when an application is started, a transparent video having a transparent channel is played, and a corresponding page is switched to at any time according to a trigger operation at different positions of the transparent video. Meanwhile, an interaction prompt is added to the transparent video, and a user can complete an interaction behavior with an advertisement through interaction, which enriches the methods for playing an advertisement video and improves the recommend effect of the advertisement video.

In this exemplary embodiment of this disclosure, the exposure of the promotion video is improved, the fun of interacting with the promotion video is added, and the recommend effects, of the promotion video, including a click/tap rate, an interaction rate, and a conversion rate, can be improved. On the basis of implementing the transparent splash screen advertisement, the occurrence of sticking in the process of starting the application is avoided, and the smoothness of loading the advertisement video in the process of starting the application is improved.

The following continuously describe an exemplary structure of the information processing apparatus 455 for a virtual scene provided in the exemplary embodiments of this disclosure as a software module. In some exemplary embodiments, as shown in FIG. 2, the software module stored in the information processing apparatus 455 for the virtual scene in the memory 450 may include: an obtaining module 4551, configured to obtain an information stream and a promotion video in response to a user trigger operation, the information stream including at least one piece of media information and the promotion video including at least one material to be recommended; and a display module 4552, configured to display, at a first area of an information stream interface, a first part of the promotion video in a presentation mode and display, at a second area of the information stream interface, a second part of the promotion video in a transparent mode, so as to enable the information stream interface to be revealed through the second area, the first area and the second area being dynamically changing areas.

In some exemplary embodiments, the display module 4552 is configured to close the promotion video and switching the information stream interface to an information recommend interface in response to a first trigger operation on the first area, wherein the information recommend interface includes related information of the material.

In some exemplary embodiments, the display module 4552 is configured to close the promotion video and switch the information stream interface to an information display interface in response to a second trigger operation on the second area, and display, in the information display interface, media information corresponding to a trigger position of the second trigger operation in the information stream.

In some exemplary embodiments, the display module 4552 is configured to, before the displaying, in the information display interface, media information corresponding to a trigger position of the second trigger operation in the information stream, obtain the trigger position of the second trigger operation on a screen, wherein the screen is a screen of a terminal device configured to display the promotion video; map first coordinates of the trigger position to second coordinates in an image processing coordinate system, where a coordinate position in the image processing coordinate system corresponds to an image displayed on the screen; determine transparent channel information corresponding to the trigger position based on the second coordinates and the image currently displayed on the screen; determine a target area corresponding to the trigger position based on the transparent channel information; and determine media information in the information stream interface that coincides with the target area, to serve as the media information corresponding to the trigger position of the second trigger operation in the information stream.

In some exemplary embodiments, the display module 4552 is configured to close the promotion video and switch the information stream interface to the information recommend interface in response to a third trigger operation on any area in the promotion video, wherein the information recommend interface includes the related information of the material.

In some exemplary embodiments, the display module 4552 is configured to display the information recommend interface corresponding to the promotion video in response to a fourth trigger operation for the terminal device that displays the promotion video, wherein the fourth trigger operation is a somatosensory operation.

In some exemplary embodiments, the display module 4552 is configured to close the promotion video in response to that a video closing condition is met, wherein the video closing condition includes any one of the following: a playing time corresponding to the promotion video arrives, or a close control in the promotion video is triggered.

In some exemplary embodiments, the display module 4552 is configured to, after the closing the promotion video in response to that a video closing condition is met, load a video playing interface in the information stream interface, wherein the video playing interface is configured to continuously play the promotion video or another video.

In some exemplary embodiments, at least one of the materials displayed in the first area meets a matching condition, wherein the matching condition includes at least one of the following: including at least one of the following types of materials in a picture of the promotion video: a material having a ratio of an imaging size thereof to a screen size being within a set ratio interval; a material having an association with the media information in information stream and revealed through the second area; or a material of which a material feature has a similarity with an interest feature of a current login account of the information stream interface.

In some exemplary embodiments, the display module 4552 is configured to, before the displaying, at a first area of an information stream interface, a first part of the promotion video in a presentation mode, extract RGB channel information and transparent channel information from the promotion video, wherein the transparent channel information corresponds to the second area; color the promotion video based on the transparent channel information, to obtain a colored video; and render the colored video in the video playing interface, wherein the video playing interface is configured to play the promotion video above the information stream interface.

In some exemplary embodiments, the display module 4552 is configured to, before the displaying, at a first area of an information stream interface, a first part of the promotion video in a presentation mode, perform channel information separation on the promotion video, to obtain an RGB channel video and a transparent channel video, wherein the RGB channel video and the transparent channel video have identical picture sizes and video durations; and splice the RGB channel video and the transparent channel video, to obtain an updated promotion video, wherein the updated promotion video is rendered into the video playing interface, and the video playing interface is configured to play the promotion video above the information stream interface.

In some exemplary embodiments, the display module 4552 is configured to, before the splicing the RGB channel video and the transparent channel video, to obtain an updated promotion video, compress the transparent channel video in the following methods: obtaining transparent channel information corresponding to each pixel of each video frame in the transparent channel video; grouping all pixels in each video frame into a plurality of pixel groups, wherein each pixel group includes a plurality of pixels, and the pixels in the pixel group are adjacent to each other; and for each pixel group, filling transparent channel information of the plurality of pixels in the pixel group into a transparent channel of a same pixel in the pixel group, so as to obtain a compressed transparent channel video.

In some exemplary embodiments, the information stream and the promotion video are drawn by a sub-thread of a processor, and a main thread of the processor is configured to render the information stream interface and the promotion video above at least a partial area of the information stream interface.

In some exemplary embodiments, the obtaining module 4551 is configured to, before the displaying, at a first area of an information stream interface, a first part of the promotion video in a presentation mode, perform feature extraction on each of the materials, to obtain a material feature of the material; obtain an object feature of an object using an application, and obtaining a degree of similarity between each material feature and the object feature; sort each material in descending order based on the degrees of similarity, to obtain a list sorted in the descending order; and select, from a top position of the list sorted in the descending order, at least one of the materials for displaying in the first area.

An exemplary embodiment of this disclosure provides a computer program product, the computer program product including a computer program or a computer-executable instruction, and the computer program or the computer-executable instruction being stored in a computer-readable storage medium. A processor of an electronic device reads the computer-executable instruction from the computer-readable storage medium, and the processor executes the computer-executable instruction, so that the electronic device performs the information processing method provided in the foregoing exemplary embodiments of this disclosure.

An exemplary embodiment of this disclosure provides a computer-readable storage medium storing a computer-executable instruction, having a computer-executable instruction or a computer program stored therein, and the computer-executable instruction or the computer program, when executed by a processor, causing the processor to perform the information processing method provided in the foregoing exemplary embodiments of this disclosure, for example, the information processing method shown in FIG. 3A.

In some exemplary embodiments, the computer-readable storage medium may be a memory such as an FRAM, a ROM, a PROM, an EPROM, an EEPROM, a flash memory, a magnetic surface memory, an optical disc, or a CD-ROM; or may be various devices including one or any combination of the foregoing memories.

In some exemplary embodiments, the computer-executable instruction may be in a form of a program, software, a software module, scripts, or code, written in any form of programming language (including compiling or interpreting languages, or declarative or procedural languages), and may be deployed in any form, including being deployed as a stand-alone program or as a module, a component, a subroutine, or another unit suitable for use in a computing environment.

For example, the computer-executable instructions may, but do not necessarily, correspond to a file in a file system, may be stored as part of a file holding other programs or data, for example, in one or more scripts stored in a hyper text markup language (HTML) document, in a single file exclusively used in a program in question, or in a plurality of collaborative files (for example, files having one or more modules, subroutines, or code portions stored therein).

For example, the executable instruction may be deployed for execution on one electronic device, or on a plurality of electronic devices located at one location, or on a plurality of electronic devices distributed at a plurality of locations and interconnected via a communication network.

To sum up, in the exemplary embodiments of this disclosure, the video in the video playing interface is displayed on the information stream interface in a presentation mode and a transparent mode, to implement video insertion in the information stream interface and enrich display modes of the video in a process of displaying the information stream, so that part of the information stream can be displayed through the transparent area in the video, the blocking of the information stream is reduced, the impact on the experience of watching the information stream is reduced, and meanwhile the attractiveness of the video material is increased and the effect of video recommend processing can be improved. The video and information stream are displayed in an asynchronous rendering mode, so that sticking formed during loading of the video in the process of displaying the information stream is reduced, the pressure on the running internal memory of the application is alleviated, and the computing resources are saved.

The foregoing descriptions are merely preferred exemplary embodiments of this disclosure and are not intended to limit the protection scope of this disclosure. Any modification, equivalent replacement, or improvement made without departing from the spirit and principle of this disclosure shall fall within the protection scope of this disclosure.

What is claimed is:

1. An information processing method performed by a terminal device, the method comprising:

obtaining an information stream and a promotion video in response to a user trigger operation, the information stream comprising at least one piece of media information and the promotion video comprising at least one material to be recommended; and displaying, at a first area of an information stream interface, a first part of the promotion video in a presentation mode and displaying, at a second area of the information stream interface, a second part of the promotion video in a transparent mode, so as to enable the information stream interface to be revealed through the second area, wherein the promotion video is overlaid over the information stream interface, the first area and the second area being dynamically changing areas both within the promotion video.

2. The method according to claim 1, wherein the method further comprises:

closing the promotion video and switching the information stream interface to an information recommend interface in response to a first trigger operation on the first area, wherein the information recommend interface comprises related information of the material.

3. The method according to claim 1, wherein the method further comprises:

closing the promotion video and switching the information stream interface to an information display interface in response to a second trigger operation on the second area, and displaying, in the information display interface, media information corresponding to a trigger position of the second trigger operation in the information stream.

4. The method according to claim 3, wherein before displaying, in the information display interface, media information corresponding to the trigger position of the second trigger operation in the information stream, the method further comprises:

obtaining the trigger position of the second trigger operation on a screen, wherein the screen is a screen of the terminal device configured to display the promotion video;

mapping first coordinates of the trigger position to second coordinates in an image processing coordinate system, wherein a coordinate position in the image processing coordinate system corresponds to an image displayed on the screen;

determining transparent channel information corresponding to the trigger position based on the second coordinates and the image currently displayed on the screen;

determining a target area corresponding to the trigger position based on the transparent channel information; and determining media information in the information stream interface that coincides with the target area, to serve as the media information corresponding to the trigger position of the second trigger operation in the information stream.

5. The method according to claim 1, wherein the method further comprises:

closing the promotion video and switching the information stream interface to an information recommend interface in response to a third trigger operation on any area in the promotion video, wherein the information recommend interface comprises related information of the material.

6. The method according to claim 5, wherein the method further comprises:

displaying the information recommend interface corresponding to the promotion video in response to a fourth trigger operation for the terminal device that displays the promotion video, wherein the fourth trigger operation is a somatosensory operation.

7. The method according to claim 6, wherein the method further comprises:

closing the promotion video in response to that a video closing condition is met, wherein the video closing condition comprises at least one of: a playback duration of the promotion video expiring, or a close control in the promotion video triggered.

8. The method according to claim 7, wherein after closing the promotion video in response to that the video closing condition is met, the method further comprises:

loading a video playing interface in the information stream interface, wherein the video playing interface is configured to continuously play the promotion video or another video.

9. The method according to claim 1, wherein the at least one material displayed in the first area meets a matching condition, wherein the matching condition comprises at least one of the following types of materials in a picture of the promotion video:

a material having a ratio of an imaging size thereof to a screen size being within a set ratio interval;

a material having an association with the media information in the information stream and revealed through the second area; or a material of which a material feature has a similarity with an interest feature of a current login account of the information stream interface.

10. The method according to claim 1, wherein before displaying, at the first area of the information stream interface, the first part of the promotion video in the presentation mode, the method further comprises:

extracting RGB channel information and transparent channel information from the promotion video, wherein the transparent channel information corresponds to the second area;

coloring the promotion video based on the transparent channel information, to obtain a colored video; and rendering the colored video into a video playing interface, wherein the video playing interface is configured to play the colored video over the information stream interface.

11. The method according to claim 1, wherein before the displaying, at the first area of the information stream interface, the first part of the promotion video in the presentation mode, the method further comprises:

performing channel information separation on the promotion video, to obtain an RGB channel video and a transparent channel video, wherein the RGB channel video and the transparent channel video have identical picture sizes and video durations; and splicing the RGB channel video and the transparent channel video to obtain an updated promotion video, wherein the updated promotion video is rendered into a video playing interface, and the video playing interface is configured to play the promotion video over the information stream interface.

12. The method according to claim 11, wherein before splicing the RGB channel video and the transparent channel video to obtain the updated promotion video, the method further comprises:

compressing the transparent channel video by:

obtaining transparent channel information corresponding to each pixel of each video frame in the transparent channel video;

grouping all pixels in each video frame into a plurality of pixel groups, wherein each pixel group comprises a plurality of pixels, and the pixels in the pixel group are adjacent to each other; and for each pixel group, filling transparent channel information of the plurality of pixels in the pixel group into a transparent channel of a same pixel in the pixel group, so as to obtain a compressed transparent channel video.

13. The method according to claim 1, wherein the information stream and the promotion video are drawn by a sub-thread of a processor, and a main thread of the processor is configured to render the information stream interface and the promotion video over at least a partial area of the information stream interface.

14. The method according to claim 1, wherein before displaying, at the first area of an information stream interface, the first part of the promotion video in the presentation mode, the method further comprises:

performing feature extraction on each of the materials, to obtain a material feature of the material;

obtaining an object feature of an object using an application, and obtaining a degree of similarity between each material feature and the object feature;

sorting each material in descending order based on the degrees of similarity, to obtain a list sorted in a descending order; and selecting, from a top position of the list sorted in the descending order, the at least one material for displaying in the first area.

15. An electronic device comprising:

a memory configured to store a computer-executable instruction; and a processor configured to implement, when executing the computer-executable instruction or a computer program stored in the memory, the information processing method according to claim 1.

16. A non-transitory computer-readable storage medium, having a computer-executable instruction or a computer program stored therein, and the computer-executable instruction or the computer program, when executed by a processor, implementing the method according to claim 1.

17. A computer program product, comprising a computer-executable instruction or a computer program, and the computer-executable instruction or the computer program, when executed by a processor, implementing the method according to claim 1.

18. An information processing apparatus, comprising a memory for storing computer instructions and a processor for executing the computer instructions to:

obtain an information stream and a promotion video in response to a user trigger operation, the information stream comprising at least one piece of media information and the promotion video comprising at least one material to be recommended; and display, at a first area of an information stream interface, a first part of the promotion video in a presentation mode and display, at a second area of the information stream interface, a second part of the promotion video in a transparent mode, so as to enable the information stream interface to be revealed through the second area, wherein the promotion video is overlaid over the information stream interface, the first area and the second area being dynamically changing areas both within the promotion video.

19. A non-transitory storage medium for storing computer readable instructions, the computer readable instructions, when executed by a processor, causing the processor to:

obtain an information stream and a promotion video in response to a user trigger operation, the information stream comprising at least one piece of media information and the promotion video comprising at least one material to be recommended; and display, at a first area of an information stream interface, a first part of the promotion video in a presentation mode and display, at a second area of the information stream interface, a second part of the promotion video in a transparent mode, so as to enable the information stream interface to be revealed through the second area, wherein the promotion video is overlaid over the information stream interface, the first area and the second area being dynamically changing areas both within the promotion video.

20. The non-transitory storage medium according to claim 19, wherein the processor is further configured to:

close the promotion video and switch the information stream interface to an information recommend interface in response to a first trigger operation on the first area, wherein the information recommend interface comprises related information of the material.

* * * * *